US008928761B2

(12) United States Patent
Yumiki

(10) Patent No.: US 8,928,761 B2
(45) Date of Patent: *Jan. 6, 2015

(54) DIGITAL CAMERA

(75) Inventor: Naoto Yumiki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/536,114

(22) Filed: Jun. 28, 2012

(65) Prior Publication Data

US 2012/0262590 A1    Oct. 18, 2012

Related U.S. Application Data

(63) Continuation of application No. 12/667,731, filed as application No. PCT/JP2008/001831 on Jul. 9, 2008, now Pat. No. 8,237,803.

(30) Foreign Application Priority Data

Jul. 9, 2007   (JP) ................................ 2007-180318

(51) Int. Cl.
*H04N 5/228*   (2006.01)
*H04N 5/232*   (2006.01)
*G03B 7/091*   (2006.01)
*G03B 17/14*   (2006.01)
*G03B 19/02*   (2006.01)
*H04N 5/235*   (2006.01)
*H04N 101/00*   (2006.01)

(52) U.S. Cl.
CPC ............ *H04N 5/23209* (2013.01); *G03B 7/091* (2013.01); *G03B 17/14* (2013.01); *G03B 19/02* (2013.01); *H04N 5/23212* (2013.01); *H04N 5/23248* (2013.01); *H04N 5/2328* (2013.01); *H04N 5/2356* (2013.01); *H04N 2101/00* (2013.01)
USPC ..................................... 348/208.12; 348/349

(58) Field of Classification Search
CPC ......... H04N 5/228; H04N 7/18; H04N 5/235; H04N 7/12; H04N 5/2356; G03B 17/00; G03B 7/00; G03B 7/083

USPC ........ 348/208.1, 208.4, 208.2, 208.3, 208.13, 348/208.16, 154, 155, 208.12, 208.14, 348/208.6; 396/153, 213, 246, 52–55, 243; 375/240.1–240.99

See application file for complete search history.

(56) References Cited

U.S. PATENT DOCUMENTS 5,099,322 A    3/1992   Gove
5,502,484 A    3/1996   Okada
(Continued)

FOREIGN PATENT DOCUMENTS

JP     04-211582 A    8/1992
JP     05-019326 A    1/1993
(Continued)

OTHER PUBLICATIONS

U.S. Office action for U.S. Appl. No. 12/033,087 dated Apr. 6, 2012.
(Continued)

*Primary Examiner* — Tuan Ho
(74) *Attorney, Agent, or Firm* — Pearne & Gordon LLP

(57) ABSTRACT

A digital single-lens reflex camera that can reduce deterioration in image quality due to a camera shake or an object movement and easily pick up an image with a good image quality. In the digital single-lens reflex camera, when a body microprocessor judges that an object speed detected based on a detected object movement is smaller than a threshold value, a conversion lens camera shake correcting device in a conversion lens or a camera body shake correcting device in a camera body is controlled to carry out camera shake correction. If the object speed is equal to or more than the threshold value, the body microprocessor makes a digital signal gain setting unit high in gain so as to increase the ISO sensitivity or makes a shatter speed faster to set a shorter exposure time and has a plurality of images continuously picked up under different exposure conditions.

10 Claims, 18 Drawing Sheets

(56) References Cited

U.S. PATENT DOCUMENTS

| | | | |
|---|---|---|---|
| 5,506,912 A | 4/1996 | Nagasaki et al. | |
| 5,642,431 A | 6/1997 | Poggio et al. | |
| 5,712,474 A | 1/1998 | Naneda | |
| 6,148,108 A | 11/2000 | Nishikawa | |
| 6,208,377 B1 | 3/2001 | Morofuji et al. | |
| 6,778,210 B1* | 8/2004 | Sugahara et al. | 348/208.4 |
| 7,030,911 B1 | 4/2006 | Kubo | |
| 7,333,132 B2 | 2/2008 | Shimizu et al. | |
| 7,889,237 B2* | 2/2011 | Okumura | 348/208.5 |
| 8,036,525 B2* | 10/2011 | Lee et al. | 396/153 |
| 8,237,803 B2* | 8/2012 | Yumiki | 348/208.4 |
| 2003/0095199 A1 | 5/2003 | Senda | |
| 2004/0207743 A1 | 10/2004 | Nozaki et al. | |
| 2004/0239775 A1 | 12/2004 | Washisu | |
| 2004/0239795 A1* | 12/2004 | Kitajima | 348/362 |
| 2005/0219393 A1 | 10/2005 | Sugimoto | |
| 2005/0231628 A1 | 10/2005 | Kawaguchi et al. | |
| 2005/0265626 A1 | 12/2005 | Endo et al. | |
| 2006/0008173 A1 | 1/2006 | Matsugu et al. | |
| 2006/0098115 A1 | 5/2006 | Toyoda | |
| 2006/0115297 A1* | 6/2006 | Nakamaru | 399/163 |
| 2006/0140602 A1 | 6/2006 | Kurata et al. | |
| 2006/0165398 A1* | 7/2006 | Imada | 396/55 |
| 2006/0171697 A1 | 8/2006 | Nojima | |
| 2006/0255986 A1 | 11/2006 | Takanezawa et al. | |
| 2007/0003262 A1* | 1/2007 | Shiratori | 396/55 |
| 2007/0030375 A1 | 2/2007 | Ogasawara et al. | |
| 2007/0065134 A1 | 3/2007 | Sugimoto | |
| 2007/0110418 A1 | 5/2007 | Imada | |
| 2007/0183765 A1 | 8/2007 | Imamura | |
| 2007/0206941 A1 | 9/2007 | Maruyama et al. | |
| 2009/0097832 A1 | 4/2009 | Yumiki et al. | |

FOREIGN PATENT DOCUMENTS

| | | |
|---|---|---|
| JP | 06-027512 A | 2/1994 |
| JP | 06-165047 A | 6/1994 |
| JP | 07-107367 A | 4/1995 |
| JP | 08-327917 A | 12/1996 |
| JP | 11-14886 A | 1/1999 |
| JP | 11-326980 A | 11/1999 |
| JP | 2000-013671 A | 1/2000 |
| JP | 2001-103366 A | 4/2001 |
| JP | 2001-125173 A | 5/2001 |
| JP | 2001-245249 A | 9/2001 |
| JP | 2001-330882 A | 11/2001 |
| JP | 2002-040506 A | 2/2002 |
| JP | 2002-084453 A | 3/2002 |
| JP | 2002-354402 A | 12/2002 |
| JP | 2003-107335 A | 4/2003 |
| JP | 2003-107555 A | 4/2003 |
| JP | 2003-156680 A | 5/2003 |
| JP | 2003-222790 A | 8/2003 |
| JP | 2003-344891 A | 12/2003 |
| JP | 2004-120576 A | 4/2004 |
| JP | 2004-320287 A | 11/2004 |
| JP | 2005-184246 A | 7/2005 |
| JP | 2005-318554 A | 11/2005 |
| JP | 2005-347873 A | 12/2005 |
| JP | 2006-050149 A | 2/2006 |
| JP | 2006-113443 A | 4/2006 |
| JP | 2006-157428 A | 6/2006 |
| JP | 2006-186481 A | 7/2006 |
| JP | 2006-208691 A | 8/2006 |
| JP | 2006-270751 A | 10/2006 |
| JP | 2007-013272 A | 1/2007 |
| JP | 2007-041570 A | 2/2007 |
| JP | 2007-82026 A | 3/2007 |
| JP | 2007-206583 A | 8/2007 |
| JP | 2008-107608 A | 5/2008 |
| WO | 2007/055280 A1 | 5/2007 |

OTHER PUBLICATIONS

U.S. Office action for U.S. Appl. No. 12/033,087 dated Oct. 20, 2011.
Japanese Office action for PCT/JP2007/042158 dated Sep. 6, 2011.
Japanese Office action for PCT/JP2007/042065 dated Jul. 5, 2011.
Extended European Search Report for PCT/JP2007/052979 dated Feb. 9, 2011.
International Search Report for PCT/JP2007/052979 dated May 22, 2007.
Yumiki, Naoto "Statement of inventor's knowledge of products Previously Sold in the United States Featuring 'Intelligent ISO Control'" Nov. 2008.
"Panasonic, Operating Instructions, Digital Camera Model No. DMC-FX07, DMX-FX3," Aug. 2006, Matsushita Electric Industrial Co., Ltd., Secaucus, NJ, U.S.A, pp. 72-73.
Hissink, Dennis, "Panasonic Lumix DMC FX07," LetsGoDigital, Jul. 19, 2006, downloaded from: http://www.letsgodigital.org/en/9104/panasonic_lumix_fx07/.
"Panasonic Lumix DMC-FX50 & DMC-FX07," Digital Photography Review, dpreview.com, Jul. 19, 2006, downloaded from: http//www.dpreview.com/news10607106071903panasonicfx50.asp.
"Panasonic Lumix DMC-FX07 Review," Photography Blog, Nov. 20, 2006, downloaded from: http//www.photographyblog.com.reviews_panasonic_lumix_dmc_fx07.php.
International Search Report for PCT/JP2008/001831 dated Oct. 14, 2008.
United States Office Action for U.S. Appl. No. 11/911,927 dated Sep. 27, 2013.

* cited by examiner

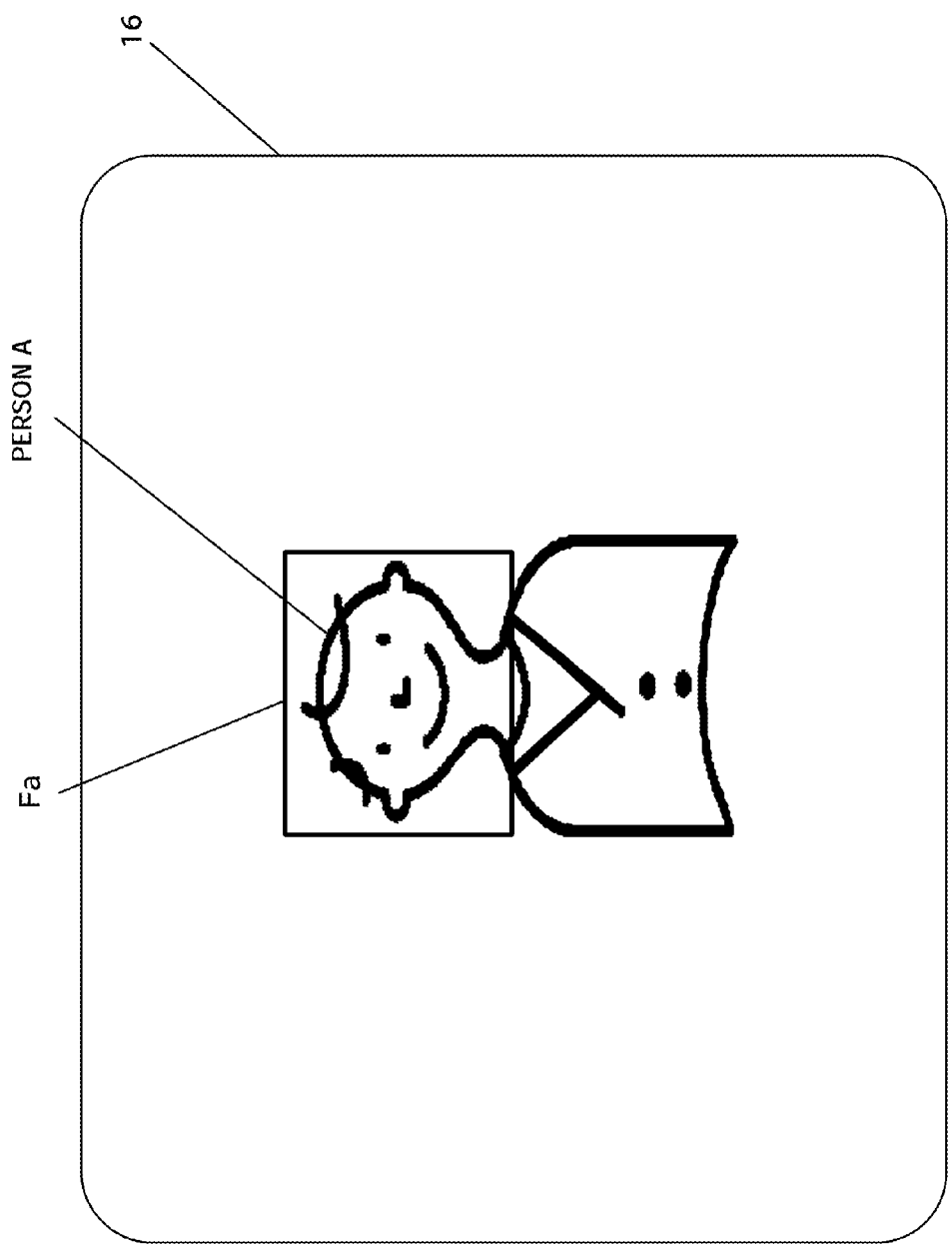

| CAMERA BODY SIDE | | REPLACEMENT LENS SIDE | | |
|---|---|---|---|---|
| | | NO CAMERA SHAKE CORRECTING APPARATUS | | WITH CAMERA SHAKE CORRECTING APPARATUS |
| | | FOCAL LENGTH BELOW 300 mm | FOCAL LENGTH EQUAL TO OR ABOVE 300 mm | |
| NO CAMERA SHAKE CORRECTING APPARATUS | (A) SENSITIVITY INCREASING MODE | (B) SENSITIVITY INCREASING MODE | (C) NORMAL PHOTOGRAPHING MODE (THRESHOLD A1) |
| WITH CAMERA SHAKE CORRECTING APPARATUS | (D) NORMAL PHOTOGRAPHING MODE (THRESHOLD A1) | (E) HIGH SENSITIVITY PREFERENTIAL PHOTOGRAPHING MODE (THRESHOLD A2) | (F) NORMAL PHOTOGRAPHING MODE (THRESHOLD A1) |

FIG.15

DIGITAL CAMERA

This application is a continuation of U.S. patent application Ser. No. 12/667,731 filed Jan. 5, 2010 which is incorporated herein by reference in its entirety.

TECHNICAL FIELD

The present invention relates to a digital single-lens reflex camera. More particularly, the present invention relates to a lens-replaceable digital single-lens reflex camera with a camera shake correcting function and a photographing sensitivity changing function.

BACKGROUND ART

Imaging apparatuses such as digital still cameras and digital video cameras capable of converting an optical image of the subject to an electrical image signal and outputting the image signal (hereinafter simply referred to as "digital cameras") are rapidly becoming widespread. With reductions in size and weight and escalation in the magnification of optical zooming in recent years in particular, digital cameras have become significantly convenient for photographers (users).

Furthermore, lens-replaceable digital single-lens reflex cameras are rapidly becoming widespread in recent years. When the photographer sees the subject through a finder, this digital single-lens reflex camera causes light incident upon the photographing lens (that is, the image of the subject) to be reflected by a reflecting mirror placed on the photographing optical path after the lens, to change the optical path, converts the image of the subject image to an erect image through a pentaprism and so on, and guides the image of the subject to an optical finder. This allows the photographer to see the subject image through the lens from the optical finder. Therefore, the position where the finder optical path is formed normally is the regular position of the reflecting mirror.

On the other hand, if the lens is used to take photographs, the reflecting mirror immediately changes its position and is retracted from the photographing optical path, thereby switching the finder optical path to the photographing optical path. When photographs have been taken, the reflecting mirror immediately returns to the regular position. This scheme is common to a conventional film camera and a digital camera which adopt a single-lens reflex scheme.

One feature of a digital camera is that it is possible to photograph a subject by looking at the display apparatus (e.g. liquid crystal monitor) when a photograph is taken and check the photographed image immediately after taking a photograph. However, using the existing reflecting mirror scheme of digital single-lens reflex cameras entails a problem that the liquid crystal monitor cannot be used when a photograph is taken. Therefore, with an existing digital single-lens reflex camera, it is not possible to take a photograph using the liquid crystal monitor by looking into the finder and this is very inconvenient to a beginner who is unfamiliar with taking photographs using a digital camera in particular. Therefore, as shown in Patent Document 1, there is a demand for a function to allow the user to take a photograph using a liquid crystal monitor also when taking a photograph.

However, accompanying reductions in size and weight of not only digital single-lens reflex cameras but also digital cameras and escalation in the magnification of optical zooming, especially when a beginner uses a digital camera, a "blur" may occur in photographed images and may cause image quality degradation.

Patent Document 2 discloses a digital camera with a blur correcting optical system capable of reducing the influence on an image even when camera shake (which will be described later) occurs when a photograph is taken. The digital camera described in Patent Document 2 moves the correction lens up, down, left and right in directions perpendicular to the optical axis, depending on image shake of when a photograph is taken, and corrects image distortion. By this means, it is possible to take a photograph with reduced image shake using a smaller-sized and lighter-weighted digital camera. Furthermore, the digital camera disclosed in Patent Document 2 does not have to use a flash to emit light upon taking a photograph to prevent image shake, so that it is possible to take a photograph under conditions producing similar atmosphere to natural colors.

On the other hand, possible causes of image quality degradation of photographed images include "subject shake" caused by the motion of the subject, in addition to "camera shake" caused by vibration added to the camera by a shaking hand. Subject shake can be prevented by making exposure time shorter and taking a photograph at a high shutter speed. Shutter speed can be made faster by, for example, increasing photographing sensitivity or by using a flash light. As for optical image shake of the subject in the imaging plane, shake caused by vibration applied to the camera, will be referred to as "camera shake" and shake caused by the motion of the subject will be referred to as "subject shake" and camera shake and subject shake will be collectively referred to as "image shake with respect to the imaging plane."

Patent Document 3 discloses a photographing apparatus with a motion prediction means for predicting the motion of the subject and changing photographing conditions such as shutter speed when the subject is likely to move, and a method applicable with the apparatus.

Patent Document 1: Japanese Patent Application Laid-Open No. 2001-125173
Patent Document 2: Japanese Patent Application Laid-Open No. 2000-13671
Patent Document 3: Japanese Patent Application Laid-Open No. 2006-157428

DISCLOSURE OF INVENTION

Problems to be Solved by the Invention

Generally, when photographing sensitivity is increased, the output signal from the imaging sensor is amplified, and, consequently, noise produced from the imaging sensor is also amplified. Therefore, an image taken in high sensitivity contains a large amount of noise. Increasing photographing sensitivity more than necessary may thus result in image quality degradation. It is therefore preferable to increase photographing sensitivity exclusively when camera shake still occurs due to insufficient ambient brightness after correction by the correcting optical system or when a fast-moving subject is photographed.

However, with such a conventional digital camera, it is difficult for photographers to know what level of moving speed of the subject causes subject shake. Therefore, cases often occur where even though it is possible to take a photograph without subject shake the photographer observing the motion of the subject misjudges that subject shake will occur. As a result, there is a problem that the photographers change photographing sensitivity to high sensitivity and take a photograph containing a large amount of noise more than necessary. Furthermore, there is a problem that when taking a photograph of a fast-moving subject, photographers need to change photographing sensitivity immediately before taking a photograph and might miss the chance to take a photograph if photographing sensitivity changes slowly.

That is, a general photographer cannot identify what level of moving speed of the subject will or will not cause subject shake. In other words, using the camera shake correcting function may result in taking a photograph with subject shake when the subject is moving fast, or, conversely, increasing photographing sensitivity may result in taking a photograph with a large amount of noise when the subject is moving slowly, and taking photographs in good quality is not possible in either case.

Furthermore, although the digital camera having a blur correcting optical system disclosed in Patent Document 2 can reduce image quality degradation due to camera shake, there is no proposal of alleviating image quality degradation caused by subject shake.

Furthermore, since the digital camera disclosed in Patent Document 3 is only directed to predicting the motion of the subject and is not directed to finding out what level of moving speed of the subject will or will not cause subject shake, it is not always possible to take a photograph at an optimal shutter speed suitable for the speed of the subject.

It is therefore an object of the present invention to provide a digital single-lens reflex camera that reduces image quality degradation due to camera shake or subject shake and that enables images of good quality to be photographed in a simple way.

Means for Solving the Problem

The digital single-lens reflex camera of the present invention is a digital single lens reflex camera with an imaging sensor and a return mirror, the camera adopting a configuration having: a focusing section that performs focus detection based on a contrast scheme using the imaging sensor; a motion detecting section that detects a speed of the subject based on an image on the imaging sensor; and a control section that performs camera shake correction according to the speed of the subject detected in the motion detecting section, and, with this camera, the focusing section, the motion detecting section and the control section enter operation mode while the return mirror is retracted from the optical axis.

Advantageous Effect of the Invention

According to the present invention, it is possible, also with a digital single-lens reflex camera, to reduce image quality degradation due to camera shake or subject shake, and take images of high image quality easily.

For example, if the subject speed is equal to or above a predetermined value (threshold), it is possible to perform continuous shooting by a plurality of exposure conditions by increasing ISO sensitivity or setting a faster shutter speed. Even if the moving speed of the subject changes substantially while taking photographs, continuous shooting by a plurality of exposure conditions increases the likelihood that images of high image quality may be included among the plurality of photographed on a continuous basis images under the plurality of exposure conditions. On the other hand, if the subject speed is below the predetermined value (threshold), operating the camera shake correcting function makes it possible to photograph images of high quality free of image shake. As a result, the photographer can photograph image in high image quality easily regardless of the motion of the subject.

BRIEF DESCRIPTION OF DRAWINGS

FIG. 4 is a schematic view showing an example of an outer configuration of the camera body shown in FIG. 1.

FIG. 14 shows a display example of an image photographed in camera shake correction mode and displayed on the display section of the digital single-lens reflex camera according to the present embodiment;

FIG. 15 illustrates a relationship between a combination of camera shake correcting apparatuses in the replacement lens and the camera body of the digital single-lens reflex camera according to the present embodiment and a threshold;

BEST MODE FOR CARRYING OUT THE INVENTION

Hereinafter, embodiments of the present invention will be explained in detail with reference to the accompanying drawings.

Figure 1:
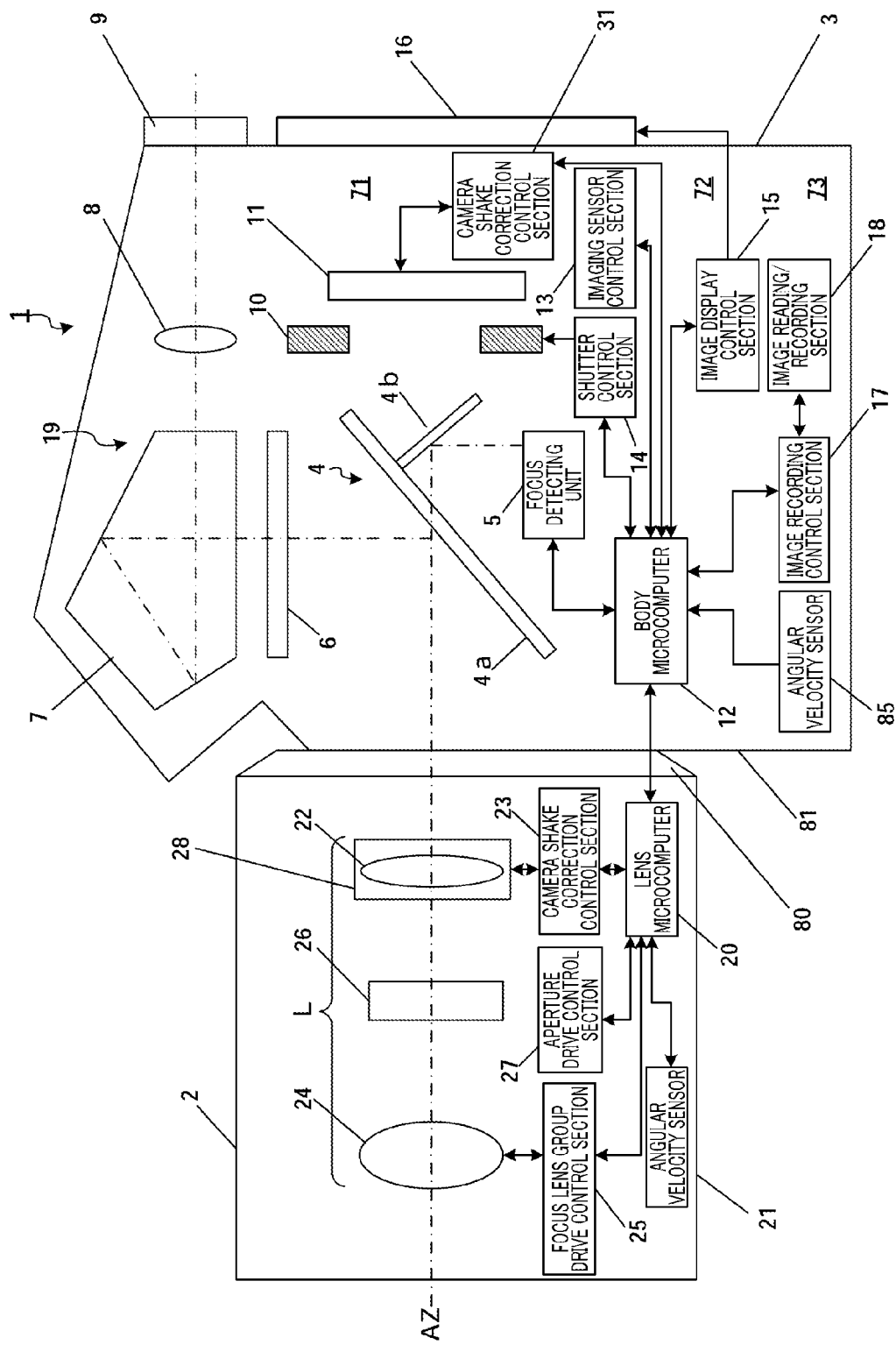
FIG. 1 is a block diagram showing an overall configuration of a digital single-lens reflex camera according to an embodiment of the present invention.
Figure 2:
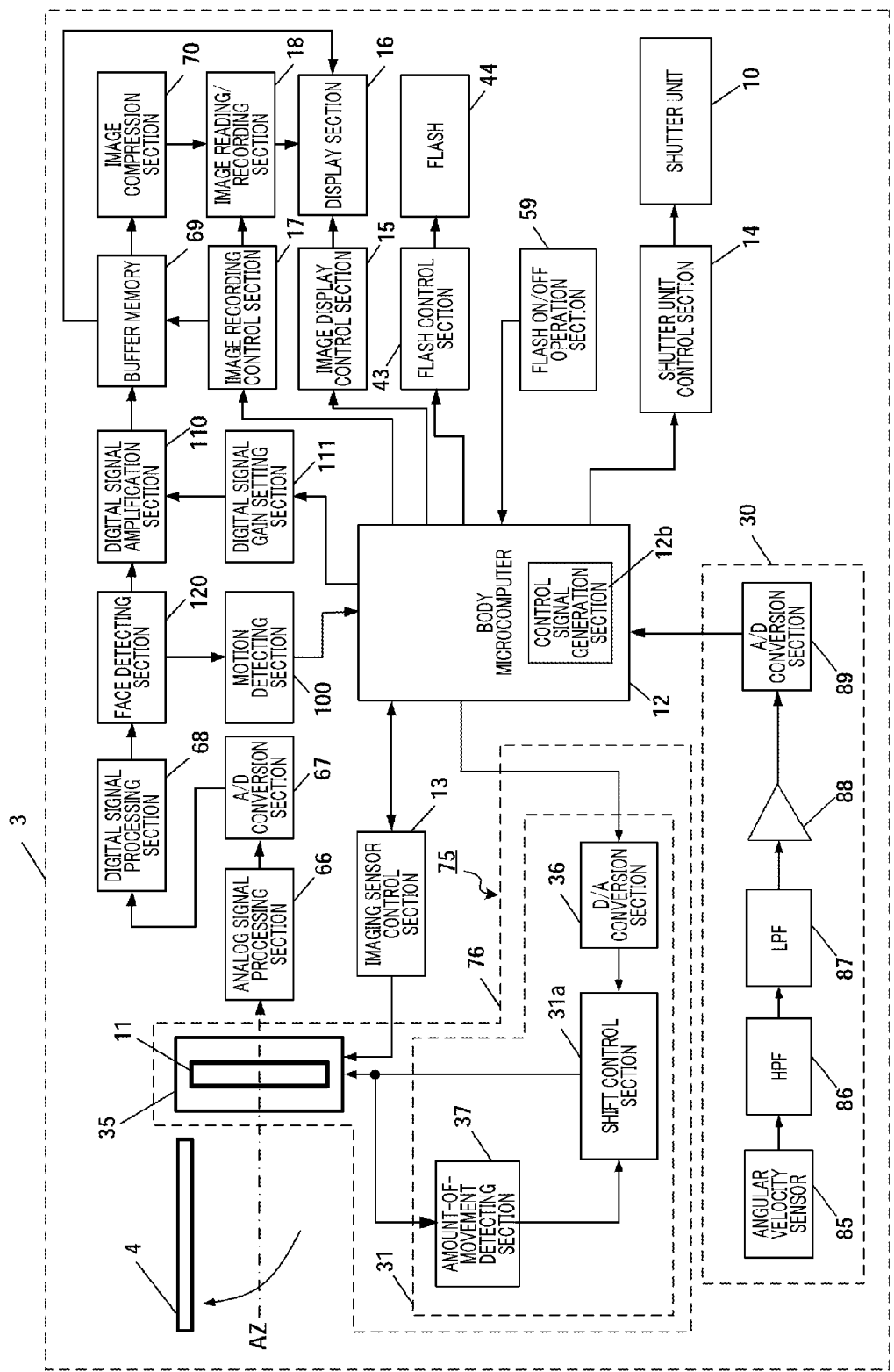
FIG. 2 is a block diagram mainly showing an example of a configuration of a control system in the configuration of the camera body shown in FIG. 1.
Figure 3:
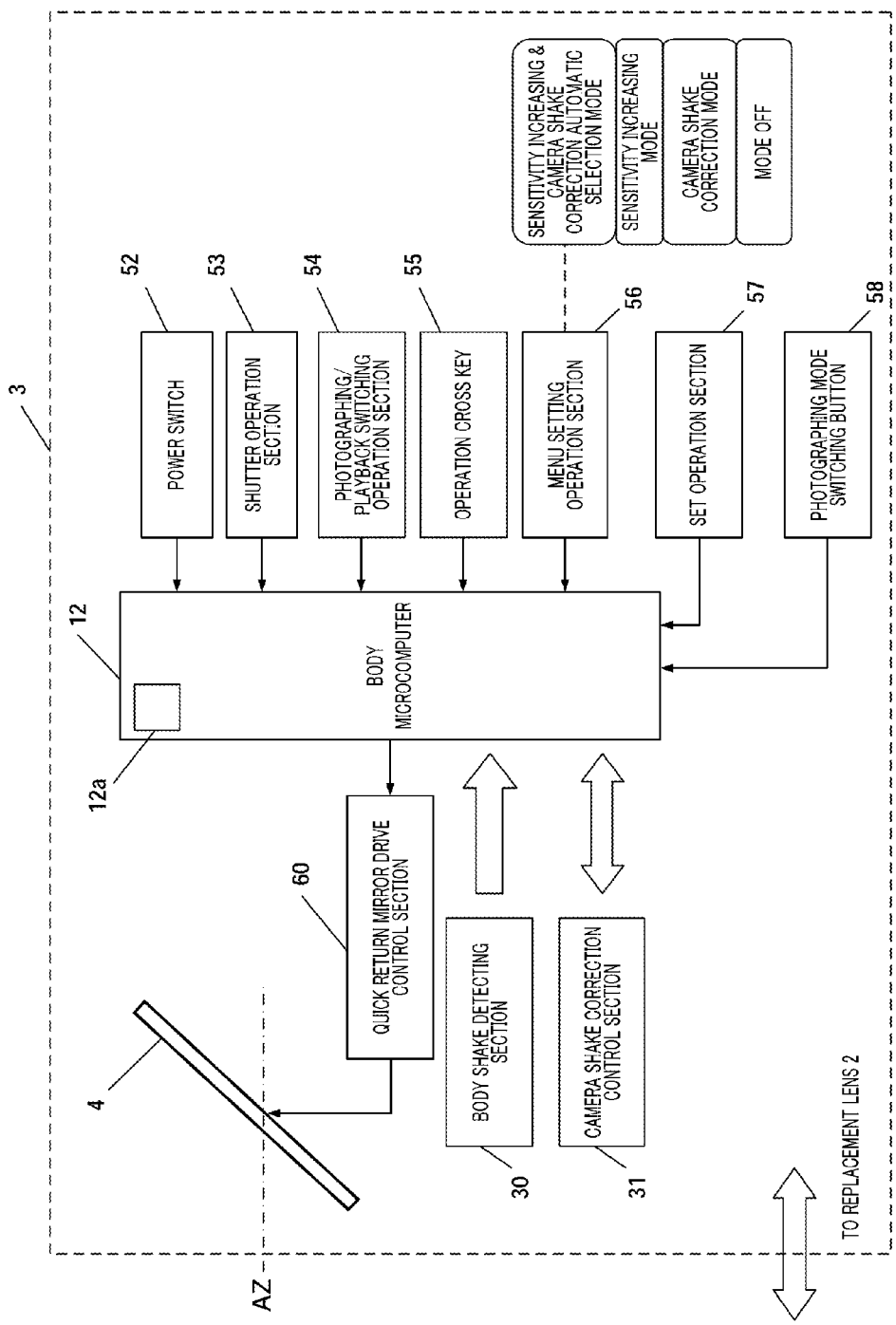
FIG. 3 is a block diagram mainly showing an example of a configuration of an operation system in the configuration of the camera body shown in FIG. 1.
Figure 4A:
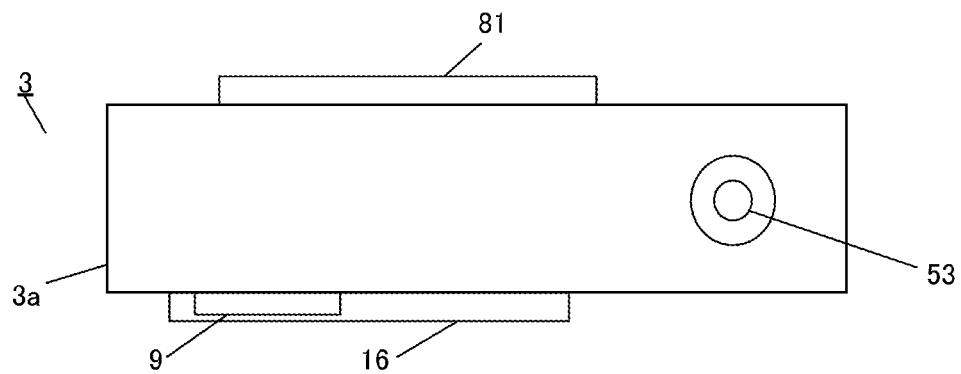
FIG. 4A showing a top view.
Figure 4B:
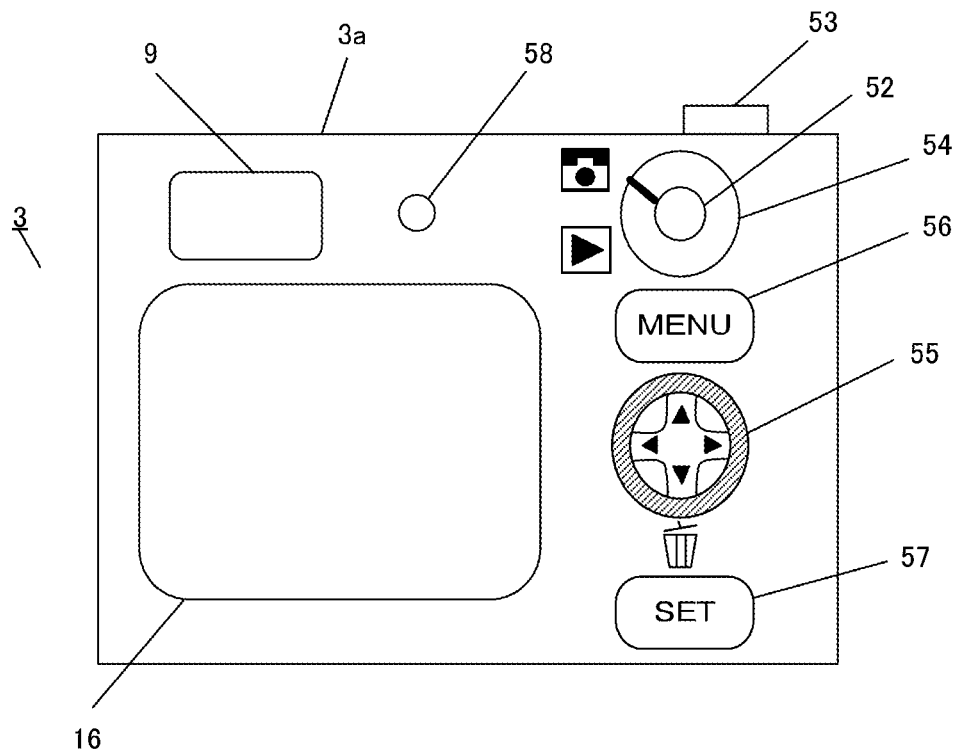
FIG. 4B showing a plan view.

FIG. 1 is a block diagram showing an overall configuration of a digital single-lens reflex camera according to an embodiment of the present invention, FIG. 2 is a block diagram mainly showing an example of a configuration of a control system in the configuration of the camera body shown in FIG. 1 and FIG. 3 is a block diagram mainly showing an example of a configuration of an operation system in the configuration of the camera body shown in FIG. 1. Furthermore, FIG. 4 is a schematic view showing an example of an outer configuration of the camera body shown in FIG. 1 and particularly FIG. 4A shows a top view and FIG. 4B shows a rear view.

The present embodiment shows a case where the present invention is applied to a digital single-lens reflex camera with a camera shake correcting function and a photographing sensitivity changing function. In the following explanations, the moving speed of the subject (hereinafter also referred to as "subject speed") means the moving speed of an optical image of the subject on the imaging plane caused by one of camera shake and subject shake or both.

(Overall Configuration of Digital Single-Lens Reflex Camera 1)

In FIG. 1, digital single-lens reflex camera 1 is a replacement lens type digital single-lens reflex camera and is primarily comprised of a camera body 3 that has main functions of digital single-lens reflex camera 1 and replacement lens 2 detachably mounted in camera body 3. Replacement lens 2 is mounted in body mount 81 provided in the front of camera body 3 via lens mount 80 provided in the rearmost part.

[Configuration of Camera Body 3]

In FIG. 1 to FIG. 3, camera body 3 is mainly comprised of imaging section 71 that picks up an image of the subject (including, for example, imaging sensor 11 and imaging sensor control section 13), body microcomputer 12 that controls the operations of the individual sections of imaging section 71 and so on as a body control section, image display section 72 that displays a photographed image and various types of information (including, for example, image display control section 15 and display section 16), image storage section 73 that stores image data (including, for example, image recording control section 17 and image reading/recording section 18) and finder optical system 19 that visually recognizes the image of the subject. As shown in further detail in FIG. 2 in particular, camera body 3 includes motion detecting section 100 that processes an electric signal from imaging section 71 (for details, see FIG. 5 (which will be described later)), digital signal amplification section 110 and digital signal gain setting section 111.

Imaging section 71 is mainly comprised of quick return mirror 4 that guides incident light to finder optical system 19 and focus detecting unit 5, imaging sensor 11 such as CCD (Charge Coupled Device) that performs photoelectric conversion, shutter unit 10 that adjusts the exposure condition of imaging sensor 11, shutter control section 14 that controls the drive of shutter unit 10 based on a control signal from body microcomputer 12, imaging sensor control section 13 that controls the operation of imaging sensor 11, camera body camera shake correcting apparatus 75 that corrects camera shake caused by the shake of digital single-lens reflex camera 1 (see FIG. 2 in particular) and focus detecting unit 5 that detects the focus (the focus condition of a subject image). Focus detecting unit 5 performs focus detection, for example, based on a general phase difference detection scheme. As for focus detection, one of focus detecting unit 5 and a contrast detection scheme based on image output of imaging sensor 11 (which will be described later) is used depending on the operating situation of digital single-lens reflex camera 1. For example, as will be described later, focus detecting unit 5 is used as a focus detecting means in finder photographing mode as with the conventional case, whereas, in monitor photographing mode, quick return mirror 4 is retracted, and therefore contrast detection is performed using imaging sensor 11 instead of using focus detecting unit 5.

Imaging sensor 11 has a function of converting an optical image formed by an imaging optical system L in replacement lens 2 to an electrical signal, and is, for example, a CCD sensor. Imaging sensor 11 is driven and controlled by imaging sensor control section 13. Imaging sensor 11 may also be a CMOS (Complementary Metal Oxide Semiconductor) sensor.

Body microcomputer 12 is the central system in camera body 3 and controls various sequences. To be more specific, body microcomputer 12 is mounted with, for example, a CPU, ROM and RAM (not shown), and can implement various functions by the CPU reading a program stored in the ROM. For example, body microcomputer 12 has a function of detecting that replacement lens 2 is mounted in camera body 3, a function of selecting which of camera shake correcting apparatuses 82 and 75 of replacement lens 2 and camera body 3 is used to perform camera shake correction and a function of setting camera shake correcting apparatus 82 or 75 in an operation enabled condition or operation disabled condition and so on. As shown in FIG. 1 to FIG. 3, body microcomputer 12 is connected to the individual sections provided in camera body 3.

Furthermore, body microcomputer 12 executes a photographing control processing for controlling the camera shake correcting function and the photographing sensitivity changing function depending on the motion of the subject. If the subject speed is below a threshold, body microcomputer 12 controls the camera shake correcting apparatus (camera shake correcting apparatus 82 for a replacement lens in replacement lens 2 or camera shake correcting apparatus 75 for a camera in camera body 3) to execute camera shake correction or if the subject speed is equal to or above the threshold, body microcomputer 12 increases the gain of the photographing sensitivity changing function or shortens the exposure time compared to the case the subject speed is below the threshold and causes a plurality of images to be photographed on a continuous basis based on different exposure conditions. Here, as for increasing the gain of the photographing sensitivity changing function and shortening the exposure time, either one or both may be done. Details of photographing control processing will be described later using a flowchart in FIG. 13. Furthermore, body microcomputer 12 can receive signals from power switch 52, shutter operation section 53, photographing/playback switching operation section 54, operation cross key 55, MENU setting operation section 56 and SET operation section 57 shown in FIG. 3. Body microcomputer 12 is an example of the control means of the present invention.

Furthermore, as shown in FIG. 3, memory section 12a in body microcomputer 12 stores various types of information about camera body 3 (body information). Examples of "body information" include (1) information about the model of camera body 3 for identifying camera body 3 (camera-specific information,) such as the name of the manufacturer of the camera body, the date of manufacturing, the model, the version of software installed in body microcomputer 12, and information about firmware update, (2) information as to whether or not camera body 3 is mounted with camera shake correcting apparatus 75, (3) when camera body 3 is mounted with camera shake correcting apparatus 75, information about detection performance such as the model and sensitivity of shake detecting section 30 for the body (which will be described later) (body-side detection performance information), (4) information about correction performance such as model and maximum correctable angle of camera shake correcting section 76 for the body (which will be described later) (body-side correction performance information), and (5) version of software for performing camera shake correction and so on. Furthermore, the body information also includes information about power consumption necessary to drive camera shake correcting section 76 for the body (body-side power consumption information) and information about a drive scheme of camera shake correcting section 76 for the body (body-side drive scheme information). Memory section 12*a* can store information transmitted from lens microcomputer 20.

In FIG. 4, casing 3*a* of camera body 3 is held by the photographer when the subject is photographed. Display section 16, power switch 52, photographing/playback switching operation section 54, operation cross key 55, MENU setting operation section 56, SET operation section 57 and photographing mode switching button 58 are provided on the back of casing 3*a*.

Power switch 52 is an operation unit for turning on and off power to digital single-lens reflex camera 1 or camera body 3. When power switch 52 causes power to turn on, power is supplied to the individual sections of camera body 3 and replacement lens 2. Photographing/playback switching operation section 54 is an operation unit for switching between photographing mode and playback mode and allows the photographer to switch between modes by turning a lever. MENU setting operation section 56 is an operation unit for setting various operations of digital single-lens reflex camera 1. Operation cross key 55 is an operation unit whereby the photographer presses the upper, lower, left and right parts to select a desired menu from various menu screens displayed on display section 16. SET operation section 57 is an operation unit for confirming execution of various menus. Photographing mode switching button 58 is an operation unit to switch between two photographing modes (finder photographing mode and monitor photographing mode) (which will be described later).

In FIG. 4, shutter operation section 53 is provided on the top surface of casing 3*a*. Shutter operation section 53 is operated by the photographer when a photograph is taken and is, for example, a release button. When shutter operation section 53 is operated, a timing signal is outputted to body microcomputer 12. Shutter operation section 53 is a two-stage pushdown switch that allows half-press operation and full-press operation. When the photographer performs the half-press operation, shutter operation section 53 starts motion detection, photometric processing and distance measuring processing for the subject (which will be described later). Furthermore, the half-press operation causes power to be supplied to individual sections including body microcomputer 12 and lens microcomputer 20. When the photographer performs the full-press operation, a timing signal is outputted. Shutter control section 14 drives a shutter drive motor (not shown) according to a control signal outputted from body microcomputer 12 which has received the timing signal, and operates shutter unit 10.

Returning to FIG. 2 again, the explanation in the configuration of camera body 3 will be continued. In FIG. 2, flash control section 43 controls the operation of flash 44. Body microcomputer 12, having received the timing signal outputted through the operation of shutter operation section 53, outputs a control signal to flash control section 43. According to this control signal, flash control section 43 makes flash 44 emit light. Flash 44 is controlled according to the amount of light received by imaging sensor 11. That is, if the output of the image signal from imaging sensor 11 is equal to or less than a predetermined value, flash control section 43 makes flash 44 work with the shutter operation and emit light automatically. By contrast, if the output of the image signal from imaging sensor 11 is equal to or above the predetermined value, flash control section 43 controls flash 44 not to emit light.

Flash ON/OFF operation section 59 is provided to set the operation of flash 44 irrespective of the output of imaging sensor 11 above. That is, flash control section 43 makes flash 44 emit light when flash ON/OFF operation section 59 is turned on, and does not make flash 44 emit light when flash ON/OFF operation section 59 is turned off.

The image signal outputted from imaging sensor 11 is sent from analog signal processing section 66 to A/D conversion section 67, digital signal processing section 68, face detecting section 120, digital signal amplification section 110, buffer memory 69, and image compression section 70 in sequence and processed. Analog signal processing section 66 applies analog signal processing such as gamma processing, to the image signal outputted from imaging sensor 11. A/D conversion section 67 converts the analog signal outputted from analog signal processing section 66 to a digital signal. Digital signal processing section 68 applies digital signal processing such as noise cancellation and contour emphasis to the image signal converted to the digital signal by A/D conversion section 67 and outputs the signal to motion detecting section 100 and digital signal amplification section 110 via face detecting section 120. Buffer memory 69 is a RAM and stores the image signal on a temporary basis.

Digital signal gain setting section 111 sets the amplification gain for the image signal after digital signal processing. Digital signal amplification section 110 amplifies the image signal using the set amplification gain and outputs the signal to buffer memory 69. The setting of amplification gain is equivalent to setting photographing sensitivity. With the present embodiment, photographing sensitivity is expressed in values equivalent to ISO sensitivity and can be set equivalent to photographing sensitivity of ISO80, 100, 200, 400, 800, 1600 and 3200, for example. Here, photographing sensitivity that can be set is not limited to these. Furthermore, photographing sensitivity may be expressed in values other than ISO sensitivity equivalents.

Furthermore, the process of amplifying an image signal is not necessarily performed in digital signal amplification section 110, and may be performed for an analog signal in analog signal processing section 66. Furthermore, the amplification process may be performed in imaging sensor 11.

The image signal stored in buffer memory 69 is sent from image compression section 70 to image reading/recording section 18 in sequence and processed. The image signal stored in buffer memory 69 is read out according to a command from image recording control section 17 and transmitted to image compression section 70. Data of the image signal transmitted to image compression section 70 is compressed according to a command from image recording control section 17. Through this compression process, the image signal is reduced to a smaller data size than source data. For example, the JPEG (Joint Photographic Experts Group) scheme is used as the compression method. After that, the compressed image signal is recorded in image reading/recording section 18 by image recording control section 17.

Image reading/recording section 18 is, for example, a built-in memory and/or a detachable, removable memory that has the function of recording the image signal in association with predetermined information to be recorded, based on the command of image recording control section 17. The predetermined information to be recorded together with the image signal includes the date and time the image is taken, focal length information, shutter speed information, F-number information and photographing mode information. The predetermined information is given, for example, in the Exif (registered trademark) format or formats similar to the Exif format.

Display section 16 is, for example, a liquid crystal monitor and displays an image signal recorded in image reading/recording section 18 or buffer memory 69 in visible image, based on a command from image display control section 15. Here, the display mode of display section 16 includes a display mode in which only image signals are displayed in visible image, and a display mode in which image signals and information at the time of taking a photograph are displayed in visible images. Display section 16 may also be an angle-variable monitor, the angle of which can be changed freely with respect to casing 3a of camera body 3.

Motion detecting section 100 detects, on a per frame basis, a vector (hereinafter "motion vector") showing the amount of position shift in the horizontal and vertical directions of the image between frames, based on the image signal converted to a digital signal. Hereinafter, the details of motion detecting section 100 will be explained.

Figure 5:
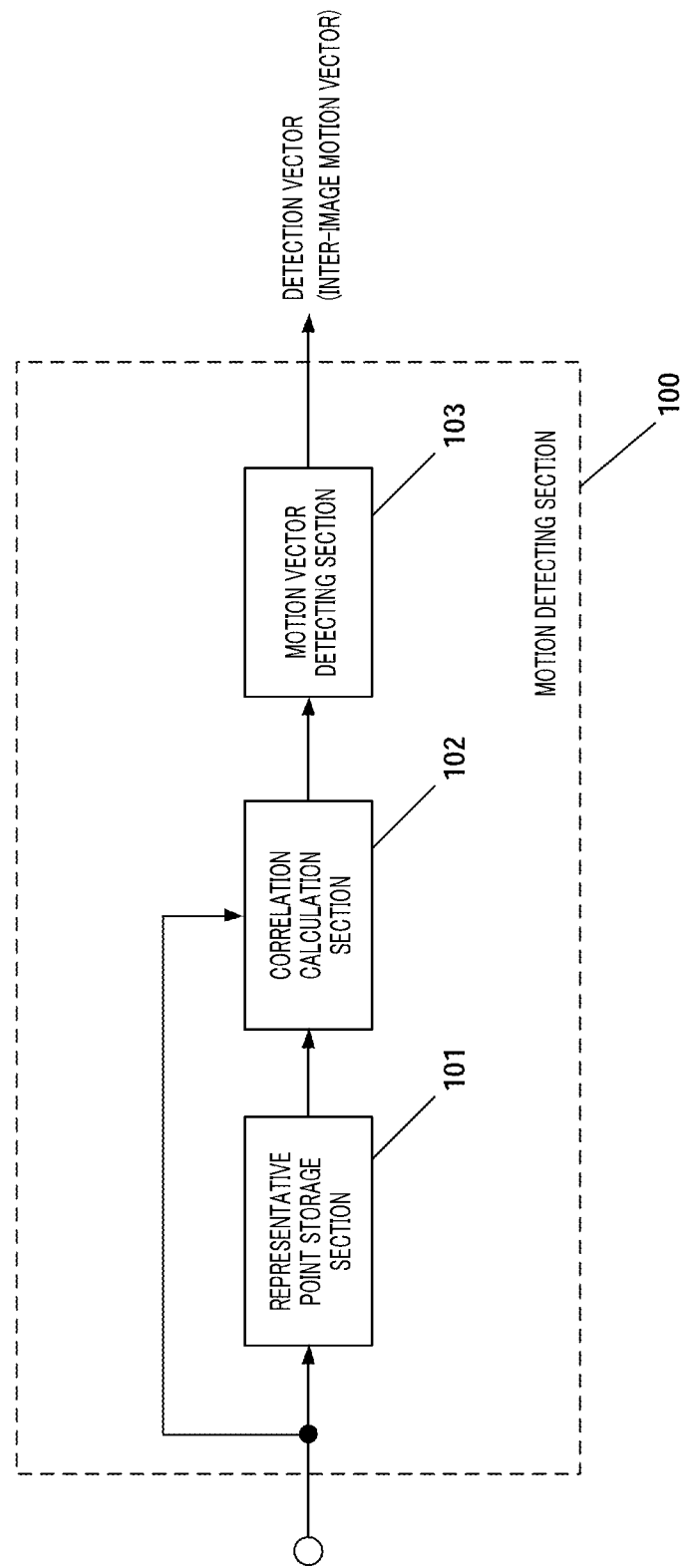
FIG. 5 is a block diagram showing an example of a configuration of the motion detecting section shown in FIG. 2.

FIG. 5 is a block diagram showing an example in the configuration of above-described motion detecting section 100. In FIG. 5, motion detecting section 100 employs a configuration including representative point memory 101, correlation calculation section 102 and motion vector detecting section 103.

Representative point memory 101 divides the image signal of the current frame inputted via A/D conversion section 67, digital signal processing section 68 and face detecting section 120 into a plurality of segments, and stores image signals corresponding to the specific representative points included in each segment as representative point signals. Furthermore, representative point memory 101 reads out the representative point signals from the previously frame of the current frame that is already stored, and outputs the signals to correlation calculation section 102.

Correlation calculation section 102 calculates the correlations between the representative signal points from the previous frame and the representative signal points in the current frame, and determines the differences between the representative signal points. The correlation calculation result is outputted to motion vector detecting section 103.

Motion vector detecting section 103 detects the motion vector of the image between the previous frame and the current frame on a per pixel basis, from the correlation calculation result by correlation calculation section 102. The detected motion vector is outputted to body microcomputer 12. Body microcomputer 12 adjusts the gain and phase of the motion vector and calculates the moving speed and direction of the subject in the image signal per unit time.

The process of detecting the motion of the subject is started by, for example, the half-press operation of shutter operation section 53 by the photographer. The start of the process may also be synchronized with the operation of turning on power switch 52 and switching to photographing mode by operating photographing/playback switching operation section 54 by the photographer.

Returning to FIG. 1, quick return mirror 4 is comprised of main mirror 4a that can reflect and allow to transmit incident light and sub-mirror 4b provided on the back of main mirror 4a to reflect transmitted light from main mirror 4a. Quick return mirror 4 can be flipped up outside the optical axis AZ by quick return mirror drive control section 60 shown in FIG. 3. The incident light is divided into two beams, reflected beam and transmitted beam, by main mirror 4a. Of the two beams, the reflected beam is guided to finder optical system 19. On the other hand, the transmitted beam is reflected by sub-mirror 4b and used as an AF beam of focus detecting unit 5. Upon normal photographing, quick return mirror 4 is flipped up outside the optical axis AZ by quick return mirror drive control section 60, shutter unit 10 is opened and an image of the subject is formed on the imaging plane of imaging sensor 11. Furthermore, while a photograph is not taken, quick return mirror 4 is placed on the optical axis AZ as shown in FIG. 3 and shutter unit 10 is set in a closed position.

Finder optical system 19 is comprised of finder screen 6, on which an image of the subject image is formed, pentaprism 7 that converts the subject image to an erect image, eyepiece 8 that guides the erect image of the subject to finder eyepiece window 9 and finder eyepiece window 9 for the photographer to see the subject image.

[Configuration of Replacement Lens 2]

Figure 6:
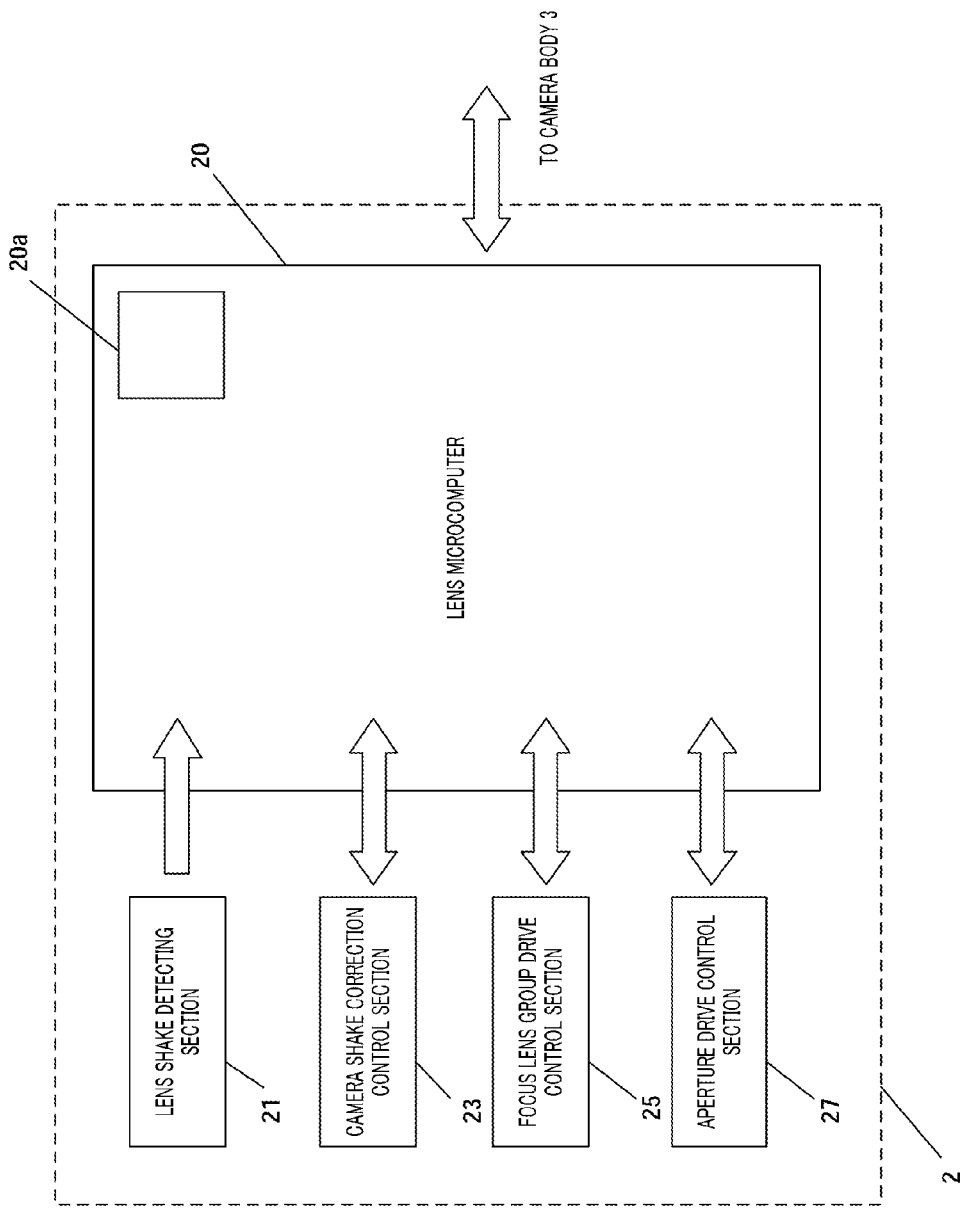
FIG. 6 is a block diagram mainly showing an example in the configuration of the control system in the configuration of the replacement lens shown in FIG. 1.
Figure 7:
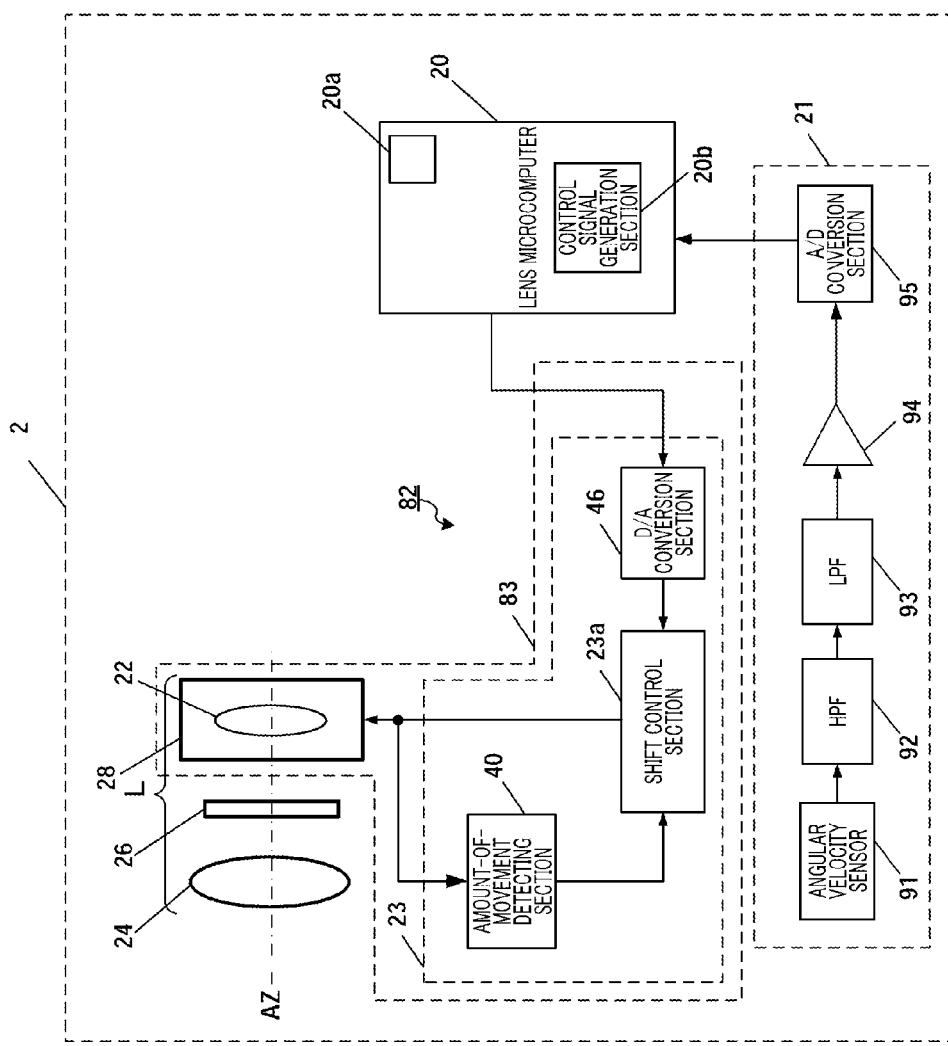
FIG. 7 is a block diagram showing an example of the control system of the camera shake correcting apparatus included in the replacement lens shown in FIG. 1.

FIG. 6 is a block diagram mainly illustrating an example of a configuration of a control system in the configuration of the replacement lens shown in FIG. 1 and FIG. 7 is a block diagram illustrating an example of the control system of the camera shake correcting apparatus included in the replacement lens shown in FIG. 1.

In FIG. 1, FIG. 6 and FIG. 7, replacement lens 2 constitutes an imaging optical system L to form an image of the subject on imaging sensor 11 in digital single-lens reflex camera 1. Replacement lens 2 is comprised of focus lens group 24 that adjusts focus, focus lens group drive control section 25 that controls the operation of focus lens group 24, aperture section 26 that adjusts closing or opening of the aperture, aperture drive control section 27 that controls the operation of aperture section 26, replacement lens camera shake correcting apparatus 82 (see FIG. 7 in particular) that corrects camera shake by adjusting an optical path and lens microcomputer 20 that controls the operation of replacement lens 2 as a lens control section. The configuration of replacement lens camera shake correcting apparatus 82 will be described in further detail later.

Lens microcomputer 20 is a control apparatus that controls the center of replacement lens 2 and is connected to individual sections mounted in replacement lens 2. To be more specific, lens microcomputer 20 is mounted with, for example, a CPU, ROM, and RAM (not shown), and lens microcomputer 20 can implement various functions by the CPU reading a program stored in the ROM. For example, lens microcomputer 20 has a function of setting replacement lens camera shake correcting apparatus 82 in an operation enabled condition or operation disabled condition based on a signal from body microcomputer 12. Furthermore, lens microcomputer 20 and body microcomputer 12 are electrically connected to lens mount 80 and body mount 81 via electric pieces (not shown) provided thereon respectively and can transmit/receive information to/from each other.

Furthermore, memory section 20a in lens microcomputer 20 stores various types of information about replacement lens 2 (lens information). Examples of "lens information" include (1) information about the model for identifying replacement lens 2 (lens-specific information) such as the name of the manufacturer of replacement lens 2, the date of manufacturing, the model, the version of software installed in lens microcomputer 20, and information about firmware update, (2) information as to whether or not replacement lens 2 is mounted with camera shake correcting apparatus 82, (3) if replacement lens 2 is mounted with camera shake correcting apparatus 82, information about detection performance such as the model and sensitivity of shake detecting section 21 for the lens (which will be described later) (lens-side detection performance information), (4) information about correction performance such as model and maximum correctable angle of camera shake correcting section 76 for the replacement lens (which will be described later) (lens-side correction performance information), and (5) the version of software for performing camera shake correction and so on. Furthermore, the lens information also includes information about power consumption necessary to drive replacement lens camera shake correcting section 83 (lens-side power consumption information) and information about a drive scheme of replacement lens camera shake correcting section 83 (lens-side drive scheme information). Memory section 20a can store information transmitted from body microcomputer 12.

[Configuration of Camera Shake Correcting Apparatus]

Camera body 3 is mounted with camera body camera shake correcting apparatus 75 (see FIG. 2) and replacement lens 2 is mounted with replacement lens camera shake correcting apparatus 82 (see FIG. 7).

FIG. 2 illustrates an example of a hardware configuration of camera body camera shake correcting apparatus 75 and FIG. 7 illustrates an example of a hardware configuration of replacement lens camera shake correcting apparatus 82.

First, camera body camera shake correcting apparatus 75 will be explained.

As shown in FIG. 2, camera body camera shake correcting apparatus 75 is an imaging sensor shift type camera shake correcting apparatus and is comprised of body shake detecting section 30 that detects the shake of digital single-lens reflex camera 1 and body camera shake correcting section 76 that corrects camera shake according to the amount of shake of digital single-lens reflex camera 1 detected by body shake detecting section 30.

Body shake detecting section 30 is comprised of angular velocity sensor 85 that detects the motion of digital single-lens reflex camera 1 itself including the imaging optical system L, high pass filter (HPF) 86 that removes the DC drift component in unnecessary band components included in the output of angular velocity sensor 85, low pass filter (LPF) 87 that removes the sensor resonance frequency component and noise component in unnecessary band components included in the output of angular velocity sensor 85, amplifier 88 that adjusts the output signal level of angular velocity sensor 85 and A/D conversion section 89 that converts the output signal of amplifier 88 to a digital signal.

Angular velocity sensor 85 outputs both positive and negative angular velocity signals depending on the moving direction of digital single-lens reflex camera 1 with reference to the output in a stationary condition of digital single-lens reflex camera 1. Angular velocity sensor 85 is, for example, a sensor that detects the motion in the yawing direction perpendicular to the optical axis AZ. Examples of angular velocity sensor 85 include a gyro sensor. FIG. 2 shows angular velocity sensor 85 in only one direction, and the shake detecting section in the pitching direction is omitted.

In this way, angular velocity sensor 85 incorporated in body shake detecting section 30 has the function of detecting the motion of digital single-lens reflex camera 1 caused by a shaking hand and other vibrations.

Body camera shake correcting section 76 is comprised of imaging sensor 11 as part of imaging section 71, imaging sensor drive section 35 that moves imaging sensor 11 up, down, left and right within the plane perpendicular to the optical axis AZ of the imaging optical system L and camera shake correction control section 31 that controls the drive of imaging sensor drive section 35. Camera shake correction control section 31 is comprised of amount-of-movement detecting section 37 that detects the actual amount of movement of imaging sensor 11 in imaging sensor drive section 35, shift control section 31a that controls the operation of imaging sensor drive section 35 so that the amount of movement detected by amount-of-movement detecting section 37 becomes the amount of drive control indicated by a control signal outputted from body microcomputer 12 and D/A conversion section 36 that converts the control signal outputted from body microcomputer 12 to an analog signal. Shift control section 31a and amount-of-movement detecting section 37 form a feedback control loop to drive and control imaging sensor drive section 35 in body camera shake correcting section 76.

Furthermore, body microcomputer 12 is provided with control signal generation section 12b that applies filtering, integration processing, phase compensation, gain adjustment and clipping processing to the output signal of angular velocity sensor 85 incorporated via A/D conversion section 89, finds the amount of drive control of imaging sensor drive section 35 necessary for camera shake correction and outputs the amount of drive control as a control signal. The control signal generated here is outputted to shift control section 31a via D/A conversion section 36 of camera shake correction control section 31. Shift control section 31a controls the drive of imaging sensor drive section 35 based on this control signal.

With such a configuration, imaging sensor 11 is shifted by imaging sensor drive section 35 so as to counterbalance the amount of shake detected by body shake detecting section 30. This allows camera body 3 to correct camera shake due to the shake of digital single-lens reflex camera 1, making it possible to suppress the influence of the shake of the photographer's hand and so on and take good photographs.

Memory section 12a in body microcomputer 12 stores data of the amount of shift from the center of the optical axis AZ of imaging sensor 11 corresponding to the focal length of replacement lens 2 used upon camera shake correction, in addition to various programs, to control the drive of camera body 3. The correction range of a camera shake correcting apparatus using an imaging sensor generally has a certain relationship with the focal length of the attached replacement lens. That is, assuming the focal length of replacement lens 2 is f[m] and the angle by which digital single-lens reflex camera 1 shakes within a predetermined time (within the exposure time) due to vibration is θ[rad], the amount of movement ΔY[m] of the image on imaging sensor 11 is expressed by equation 1 below.

$$\Delta Y = f \times \tan \theta \quad \text{(Equation 1)}$$

Therefore, upon camera shake correction, by contrast, driving imaging sensor 11 and canceling out the amount of movement ΔY of this image allows camera shake to be corrected. In other words, the maximum correctable angle θ that can be corrected through camera shake correction is determined by a variable range of individual camera body camera shake correcting apparatus 75.

Next, replacement lens camera shake correcting apparatus 82 will be explained.

As shown in FIG. 6 and FIG. 7, replacement lens camera shake correcting apparatus 82 is an optical camera shake correcting apparatus and is comprised of lens shake detecting section 21 that detects the shake of digital single-lens reflex camera 1 and lens camera shake correcting section 83 that corrects camera shake according to the amount of shake detected by lens shake detecting section 21.

Lens shake detecting section 21 is comprised of angular velocity sensor 91 that detects the motion of digital single-lens reflex camera 1 itself including the imaging optical system L, high pass filter (HPF) 92 that removes the DC drift component in unnecessary band components included in the output of angular velocity sensor 91, low pass filter (LPF) 93 that removes the sensor resonance frequency component and noise component in unnecessary band components included in the output of angular velocity sensor 91, amplifier 94 that adjusts the output signal level of angular velocity sensor 91 and A/D conversion section 95 that converts the output signal of amplifier 94 to a digital signal. Examples of angular velocity sensor 91 include a gyro sensor.

Lens camera shake correcting section 83 is comprised of shake correction lens group 22 that constitutes part of the imaging optical system L, correction lens drive section 28 that moves shake correction lens group 22 within a plane perpendicular to the optical axis AZ of the imaging optical system L and camera shake correction control section 23 that controls the operation of correction lens drive section 28 according to the amount of shake detected by shake detecting section 21. The imaging optical system L is not limited to the configuration of the optical system above.

Camera shake correction control section 23 is comprised of amount-of-movement detecting section 40 that detects the actual amount of movement of shake correction lens group 22 in correction lens drive section 28, shift control section 23a that controls the operation of correction lens drive section 28 so that the amount of movement detected by amount-of-movement detecting section 40 becomes the amount of drive control indicated by a control signal outputted from lens microcomputer 20 and D/A conversion section 46 that converts the control signal outputted from lens microcomputer 20 to an analog signal. Shift control section 23a and amount-of-movement detecting section 40 form a feedback control loop to drive and control correction lens drive section 28 in replacement lens camera shake correcting apparatus 82.

With such a configuration, shake correction lens group 22 is shifted by correction lens drive section 28 so as to counterbalance the amount of shake detected in lens shake detecting section 21, thereby correcting camera shake.

Lens microcomputer 20 is provided with control signal generation section 20b that applies filtering, integration processing, phase compensation, gain adjustment and clipping processing to the output signal of angular velocity sensor 91 incorporated via A/D conversion section 95, finds the amount of drive control of correction lens drive section 28 necessary for shake correction and outputs the amount of drive control as a control signal. The control signal generated here is outputted to shift control section 23a via D/A conversion section 46. Camera shake correction control section 23 controls the drive of correction lens drive section 28 based on this control signal. This allows replacement lens 2 to optically correct the camera shake produced by the shake of digital single-lens reflex camera 1, making it possible to suppress the influence of the shake of the photographer's hand and take good photographs.

Furthermore, memory section 20a in lens microcomputer 20 stores data indicating the focal length and the relationship between the distance from the subject and the amount of movement of focus lens group 24, and data of the amount of shift from the center of the optical axis AZ of shake correction lens group 22 according to the focal length and so on, in addition to various programs to control the drive of replacement lens 2. As for the amount of shift of shake correction lens group 22, information about the maximum correctable angle θ that can be corrected by replacement lens 2 based on the amount of movement ΔY of the image expressed by equation 1 above is stored in memory section 20a. Furthermore, memory section 20a also stores information about power consumption necessary to drive shake correction lens group 22 upon camera shake correction.

As described above, digital single-lens reflex camera 1 according to the present embodiment is a digital single-lens reflex camera having monitor photographing mode with a camera shake correcting function and is comprised of camera body 3 and replacement lens 2 detachably mounted in camera body 3. Features in the configuration are summarized as follows. Monitor photographing mode will be described later.

Camera body 3 includes imaging sensor 11, quick return mirror 4, a focusing means that performs focus detection based on a contrast scheme using imaging sensor 11, motion detecting section 100 that detects the subject speed from the image on imaging sensor 11 and a control means that performs camera shake correction according to the subject speed detected by motion detecting section 100, in which the focusing means, motion detecting section 100 and the control means start operating while quick return mirror 4 is retracted from the optical axis. The control section above can be any means as long as it works as a control means to correct camera shake. Furthermore, the camera shake correction here includes not only a case where some lenses of the imaging optical system L or imaging sensor 11 are/is moved to optically correct shake but also a case where camera shake is corrected through signal processing or also a combination of these cases. With digital single-lens reflex camera 1, such a control means, focusing means and motion detecting section 100 enter operation mode while quick return mirror 4 is retracted from the optical axis. The focusing means is realized by body microcomputer 12 that calculates the AF evaluation value and so on (which will be described later).

Furthermore, digital single-lens reflex camera 1 has a camera shake correcting section, which is mounted in at least one of camera body 3 and replacement lens 2 to correct the shake of the optical image due to the motion of camera body 3. To be more specific, digital single-lens reflex camera 1 has camera body camera shake correcting apparatus 75 on the camera body 3 side and replacement lens camera shake correcting apparatus 82 on the replacement lens 2 side. The control means above increases, if the subject speed detected by motion detecting section 100 is equal to or above a threshold, the amplification factor of the image or shortens the exposure time, or controls, if the subject speed detected by motion detecting section 100 is below the threshold, camera body camera shake correcting apparatus 75 or replacement lens camera shake correcting apparatus 82 to optically execute camera shake correction. As for increasing the amplification factor of the image and shortening the exposure time, either one or both may be done.

The operation of digital single-lens reflex camera 1 configured as shown above will be explained below.

First, the photographing operation of digital single-lens reflex camera 1 will be explained.

Figure 8:
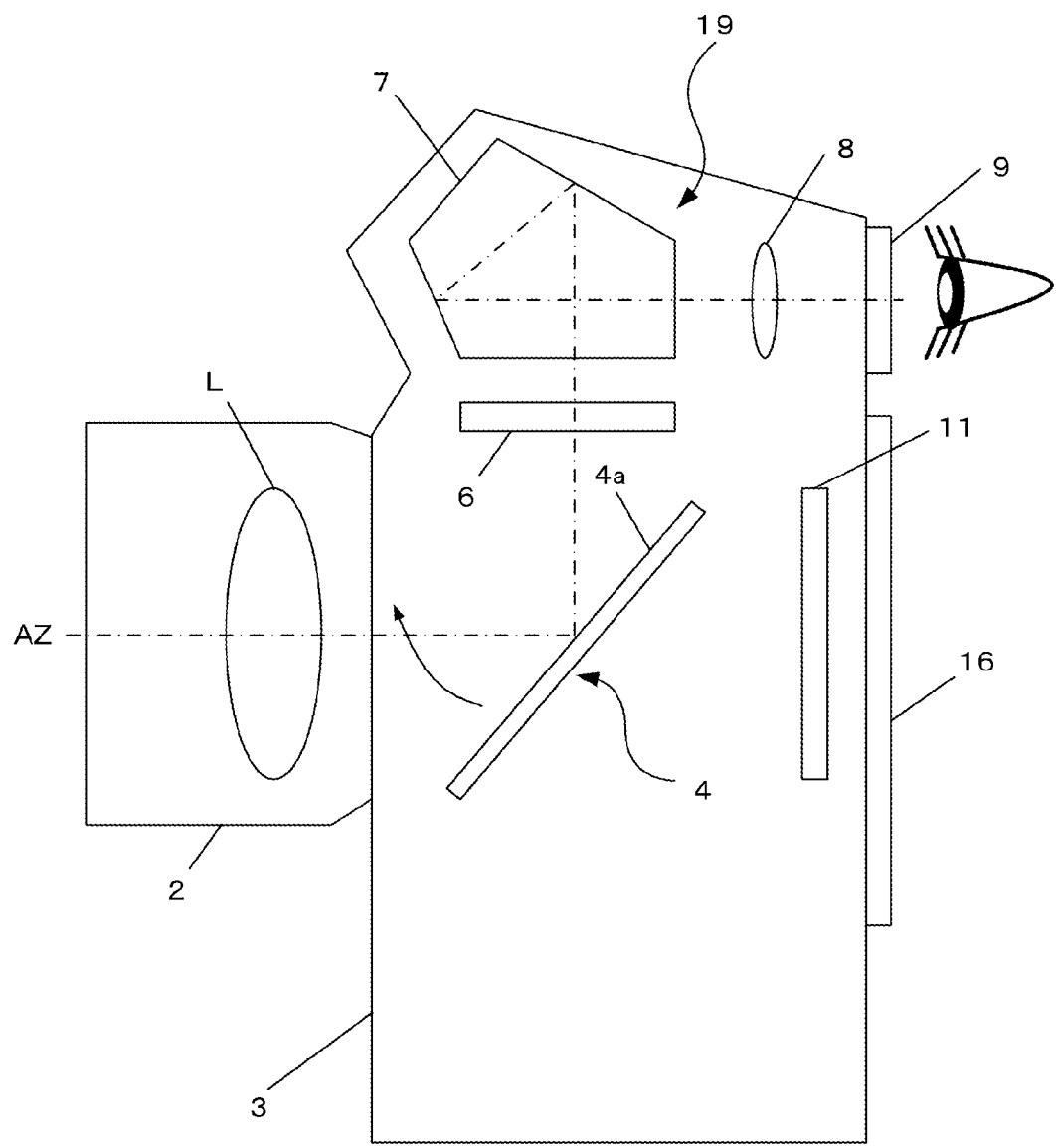
FIG. 8 is a conceptual diagram illustrating finder photographing mode in the present embodiment.
Figure 9:
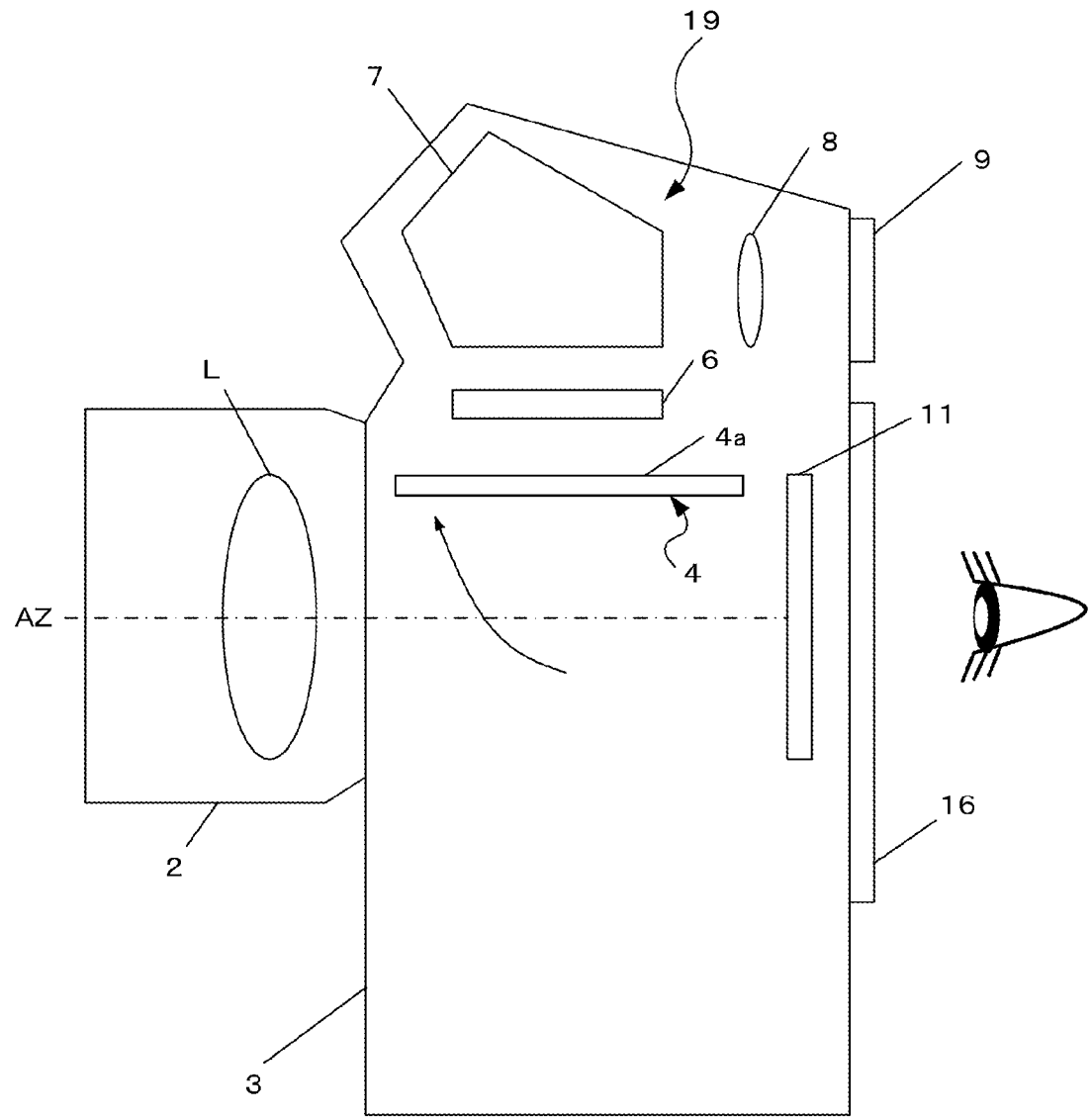
FIG. 9 is a conceptual diagram illustrating monitor photographing mode in the present embodiment.

FIG. 8 and FIG. 9 are conceptual diagrams of digital single-lens reflex camera 1 at the time of taking a photograph, and, particularly, FIG. 8 is a conceptual diagram illustrating finder photographing mode, and FIG. 9 is a conceptual diagram illustrating monitor photographing mode.

[Operation Before Imaging]

As shown in FIG. 8 and FIG. 9, light from the subject (not shown) passes replacement lens 2 and is incident on main mirror 4a, which is a semitransparent mirror of quick return mirror 4. Part of the light incident upon main mirror 4a is reflected and is incident on finder screen 6, while the rest of the light passes quick return mirror 4 and is incident on sub-mirror 4b (not shown). Light incident upon finder screen 6 forms an image of the subject. This subject image is converted by pentaprism 7 to an erect image and is incident on eyepiece 8. This allows the photographer to see the erect image of the subject via finder eyepiece window 9. On the other hand, the light incident upon sub-mirror 4b (not shown) is reflected here and is incident on focus detecting unit 5 (not shown).

[Finder Photographing Mode and Monitor Photographing Mode]

This digital single-lens reflex camera 1 has two photographing modes using different subject checking methods, that is, finder photographing mode and monitor photographing mode. Here, "finder photographing mode" is a photographing mode in which the photographer takes a photograph by observing the subject from finder eyepiece window 9, and is normal photographing mode for a conventional single-lens reflex camera. On the other hand, "monitor photographing mode" is a photographing mode in which the photographer takes a photograph while viewing the subject as a photographed image of display section 16 and is one of features of the present embodiment.

In finder photographing mode, as shown in FIG. 8, quick return mirror 4 is placed in a predetermined position in the optical axis AZ, the subject light is guided to finder optical system 19, and the photographer can therefore observe the subject image from finder eyepiece window 9. When a photograph is actually taken, quick return mirror 4 is flipped up outside the optical axis AZ, shutter unit 10 is opened, and an image of the subject is formed on the imaging plane of imaging sensor 11.

On the other hand, in monitor photographing mode, as shown in FIG. 9, quick return mirror 4 is retracted from within the optical axis AZ. Therefore, an image of the subject via imaging sensor 11, that is, a so-called "through-the-lens image" is displayed on display section 16.

[Operation of Finder Photographing Mode]

Next, the photographing operation of digital single-lens reflex camera 1 will be explained. First, a drive sequence in finder photographing mode in which the photographer takes a photograph by looking into finder eyepiece window 9 will be explained using FIG. 1 to FIG. 4 and FIG. 8.

When taking a photograph in finder photographing mode, the photographer sets finder photographing mode by operating photographing mode switching button 58 provided on the back of casing 3a.

After that, a half-press operation of shutter operation section 53 by the photographer causes power to be supplied to body microcomputer 12 and various units in digital single-lens reflex camera 1. Body microcomputer 12 in digital single-lens reflex camera 1 started upon power-up receives various types of lens data from lens microcomputer 20 in replacement lens 2 likewise started upon power-up via lens mount 80 and body mount 81 and saves the lens data in built-in memory section 12a. Next, body microcomputer 12 acquires the amount of defocus (hereinafter referred to as "the amount of Df") from focus detecting unit 5 and commands lens microcomputer 20 to drive focus lens group 24 for the amount of Df. Lens microcomputer 20 then controls focus lens group drive control section 25 to operate focus lens group 24 for the amount of Df. Repeating focus detection and the drive of focus lens group 24 in this way causes the amount of Df to decrease. When the amount of Df falls to or below a predetermined amount, body microcomputer 12 judges that focus is achieved, and stops the drive of focus lens group 24.

After that, when the photographer fully presses shutter operation section 53, body microcomputer 12 commands lens microcomputer 20 to set the aperture value to the aperture value calculated based on the output from a photometric sensor (not shown). Lens microcomputer 20 then controls aperture drive control section 27 to narrow the aperture of aperture section 26 to the aperture value commanded. At the same time with the command regarding the aperture value, body microcomputer 12 causes quick return mirror control section 60 to retract quick return mirror 4 from within the optical axis AZ. After quick return mirror 4 has been retracted, imaging sensor control section 13 commands the drive of imaging sensor 11 and shutter control section 14 commands the operation of shutter unit 10. Shutter control section 14 exposes imaging sensor 11 for a period of time corresponding to the shutter speed calculated based on the output from the photometric sensor above.

After the exposure is finished, the image data read from imaging sensor 11 by imaging sensor control section 13 is subjected to predetermined image processing and displayed on display section 16 as a photographed image. On the other hand, the image data read from imaging sensor 11 and subjected to predetermined image processing is written to image reading/recording section 18 as image data. Furthermore, after completion of the exposure, quick return mirror 4 and shutter unit 10 are reset to their initial positions. Furthermore, body microcomputer 12 commands lens microcomputer 20 to reset the aperture of aperture section 26 in an open position and lens microcomputer 20 issues a reset command to each unit. After the resetting is completed, lens microcomputer 20 informs body microcomputer 12 of the completion of reset. Body microcomputer 12 waits for information indicating completion of resetting from lens microcomputer 20 and completion of a series of processes after the exposure, and, upon confirming that the shutter operation section 53 is not set in a pressed position, finishes the drive sequence.

[Operation of Monitor Photographing Mode]

Next, a drive sequence in monitor photographing mode in which the photographer takes a photograph using display section 16 will be explained using FIG. 1 to FIG. 4 and FIG. 9.

When taking a photograph using display section 16, the photographer sets monitor photographing mode by operating photographing mode switching button 58. When monitor photographing mode is set, body microcomputer 12 causes quick return mirror 4 to retract from within the optical axis AZ. This allows the light from the subject to reach imaging sensor 11, so that imaging sensor 11 can convert the light from the subject, whose image is formed on imaging sensor 11, to image data, and acquire and output the image of the subject as image data. The image data read from imaging sensor 11 by imaging sensor control section 13 is subjected to predetermined image processing and then displayed on display section 16 as a photographed image. Thus, by causing display section 16 to display a photographed image, the photographer can chase the subject without looking into finder eyepiece window 9.

In this monitor photographing mode, instead of a phase difference detection scheme using focus detecting unit 5, contrast type autofocus based on image data generated by imaging sensor 11 is used as a focusing method thereof. Using the contrast scheme as the autofocus operation scheme in monitor photographing mode using display section 16, it is possible to realize accurate focus operations as the digital single-lens reflex camera. This is because in this monitor photographing mode, image data is generated by imaging sensor 11 on a regular basis, and it is therefore easy to perform an autofocus operation based on the contrast scheme using that image data.

Next, the autofocus operation using the contrast scheme will be explained.

When performing an autofocus operation based on the contrast scheme, body microcomputer 12 requests contrast AF data from lens microcomputer 20. Contrast AF data refers to data required in the autofocus operation under the contrast scheme, and examples of contrast AF data include the focus drive speed, the amount of focus shift, the magnification of the image and information about the necessity for contrast AF.

Body microcomputer 12 regularly generates vertical synchronization signals. Furthermore, in parallel with this, body microcomputer 12 generates an exposure synchronization signal based on a vertical synchronization signal. Thus, body microcomputer 12 can generate an exposure synchronization signal based on a vertical synchronization signal because body microcomputer 12 knows in advance the exposure start timing and exposure end timing with reference to the vertical synchronization signal. Body microcomputer 12 outputs the vertical synchronization signal to a timing generator (not shown) and outputs the exposure synchronization signal to lens microcomputer 20. Lens microcomputer 20 acquires position information of focus lens group 24 via focus lens group drive control section 25 in synchronization with the exposure synchronization signal.

Imaging sensor control section 13 regularly generates a reading signal of imaging sensor 11 and electronic shutter drive signal based on the vertical synchronization signal. Imaging sensor control section 13 drives imaging sensor 11 based on the reading signal and electronic shutter drive signal. That is, imaging sensor 11 reads out pixel data generated by many photoelectric conversion devices (not shown) existing in imaging sensor 11 to the vertical transfer section (not shown) according to the reading signal.

Next, through a half-press operation of shutter operation section 53 by the photographer, body microcomputer 12 of digital single-lens reflex camera 1 receives various types of lens data from lens microcomputer 20 in replacement lens 2 via lens mount 80 and body mount 81 and saves the lens data in built-in memory section 12a. Furthermore, body microcomputer 12 sends an autofocus start command to lens microcomputer 20. The autofocus start command when shutter operation section 53 is half-pressed is a command indicating that an autofocus operation based on a contrast scheme should be started. Upon receiving this command, lens microcomputer 20 drives and controls focus lens group 24 in a direction parallel to the optical axis AZ. Furthermore, body microcomputer 12 calculates an evaluation value for autofocus operation (hereinafter referred to as "AF evaluation value") based on the received image data. To be more specific, as the method of calculating an AF evaluation value, for example, a method is known, whereby a brightness signal is obtained from image data generated by imaging sensor 11, and an AF evaluation value is found by adding up the high frequency components of the brightness signal within the screen. The calculated AF evaluation value is associated with the exposure synchronization signal and saved in, for example, a DRAM (not shown) constituting memory section 12a. The lens position information acquired from lens microcomputer 20 is also associated with the exposure synchronization signal. Therefore, body microcomputer 12 can save the AF evaluation value in association with the lens position information.

Next, body microcomputer 12 finds a contrast peak based on the AF evaluation value saved in the DRAM above and monitors whether or not a focus point has been successfully extracted. To be more specific, body microcomputer 12 extracts the position of focus lens group 24 where the AF evaluation value becomes the maximum value as a focus point. As this lens drive scheme, a hill-climbing method is generally known.

Furthermore, in this state, digital single-lens reflex camera 1 displays the image indicated by image data generated by imaging sensor 11 on display section 16 as a through-the-lens image. Since this through-the-lens image is displayed on display section 16 as video image, the photographer can determine the composition to pick up a still image or video image by looking into display section 16.

After that, when the photographer fully presses shutter operation section 53, body microcomputer 12 commands lens microcomputer 20 to adopt the aperture value calculated based on the output of imaging sensor 11 as the aperture value. Lens microcomputer 20 then controls aperture drive control section 27 to narrow the aperture of aperture section 26 to the aperture value commanded. Furthermore, imaging sensor control section 13 commands the drive of imaging sensor 11 and shutter control section 14 commands the operation of shutter unit 10. Shutter control section 14 exposes imaging sensor 11 for a period of time corresponding to the shutter speed calculated based on the output of imaging sensor 11.

After the exposure is finished, the image data read from imaging sensor 11 by imaging sensor control section 13 is subjected to predetermined image processing and then displayed on display section 16 as a photographed image. Furthermore, the image data read from imaging sensor 11 and subjected to predetermined image processing is written to image reading/recording section 18 as image data. Furthermore, after completion of the exposure, since quick return mirror 4 is located in a position retracted from within the optical axis AZ, the photographer can continue viewing the subject in monitor photographing mode as a photographed image on display section 16.

When canceling monitor photographing mode, the photographer operates photographing mode switching button 58 to switch the mode to finder photographing mode in which a photograph is taken by looking into finder eyepiece window 9. When the mode is switched to finder photographing mode, quick return mirror 4 is returned to a predetermined position within the optical axis AZ. Furthermore, also when power to digital single-lens reflex camera 1 or camera body 3 is cut, quick return mirror 4 is returned to the predetermined position within the optical axis AZ.

[Second Configuration of Camera Body]

Figure 10:
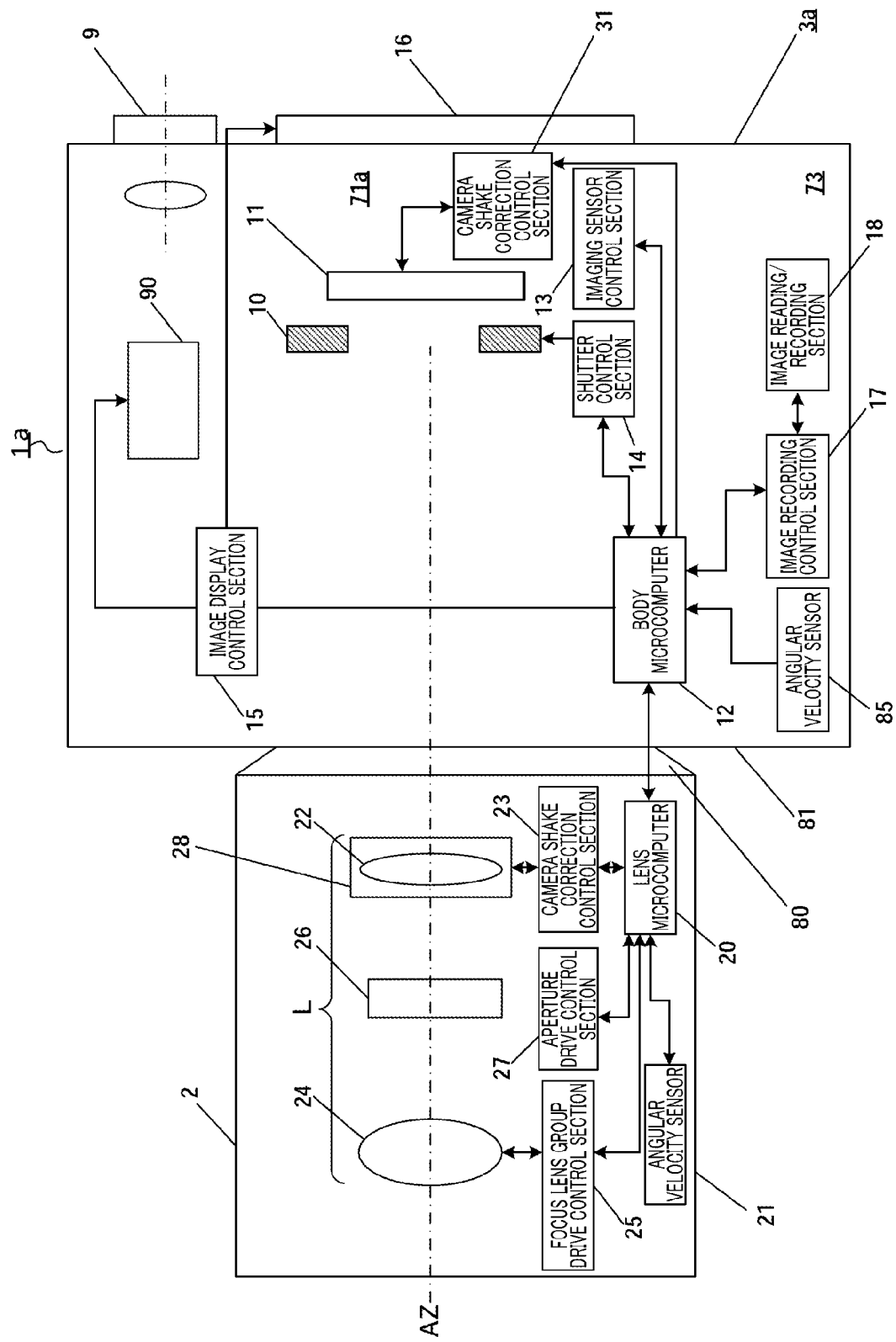
FIG. 10 is a block diagram showing a modification example of the digital single-lens reflex camera shown in FIG. 1.

FIG. 10 is a block diagram showing a modification example of the digital single-lens reflex camera shown in FIG. 1. In FIG. 10, the same components as those in FIG. 1 are assigned the same reference numerals.

In FIG. 10, digital single-lens reflex camera 1a is a replacement lens type digital single-lens reflex camera and is roughly comprised of camera body 3a having main functions of digital single-lens reflex camera 1a and replacement lens 2 detachably mounted in camera body 3a. Replacement lens 2 is attached to body mount 81 provided in the front of camera body 3a via lens mount 80 provided in the rearmost part.

A modification in camera body 3a shown in FIG. 10 made to camera body 3 shown in FIG. 1 is in that quick return mirror 4 that guides incident light in camera body 3 shown in FIG. 1 to finder optical system 19 and focus detecting unit 5 is removed from imaging section 71a and electronic finder section 90 such as a liquid crystal finder is provided instead. As in the case of display section 16, by causing electronic finder section 90 to display an image signal recorded in image reading/recording section 18 or buffer memory 69 as a visible image based on a command from image display control section 15, the photographer can observe the subject image through finder eyepiece window 9.

Camera body 3a can be made thinner by removing finder optical system 19 and quick return mirror 4. Moreover, since a "lens back," which is the distance from the hindmost lens of replacement lens 2 to imaging sensor 11, can be shortened, it is possible to reduce the size of replacement lens 2.

Furthermore, camera body 3a in FIG. 10 can realize accurate focus operations by always using a contrast scheme based on image data generated by imaging sensor 11 as a focus detection method thereof. Furthermore, given that the operation of opening/closing quick return mirror 4 is no longer necessary, it is possible to make the focus operation faster and more silent, and furthermore support not only conventional still-image photographing but also video photographing.

The following explanations are explanations of operation applicable to both digital single-lens reflex camera 1 shown in FIG. 1 and digital single-lens reflex camera 1a shown in FIG. 10. Therefore, the operation of digital single-lens reflex camera 1 shown in FIG. 1 will be explained as a representative example below.

[Selection Operation when Replacement Lens is Mounted in Camera Body]

Next, a more specific camera shake correcting apparatus selection operation when replacement lens 2 is mounted on camera body 3 will be explained.

Figure 11:
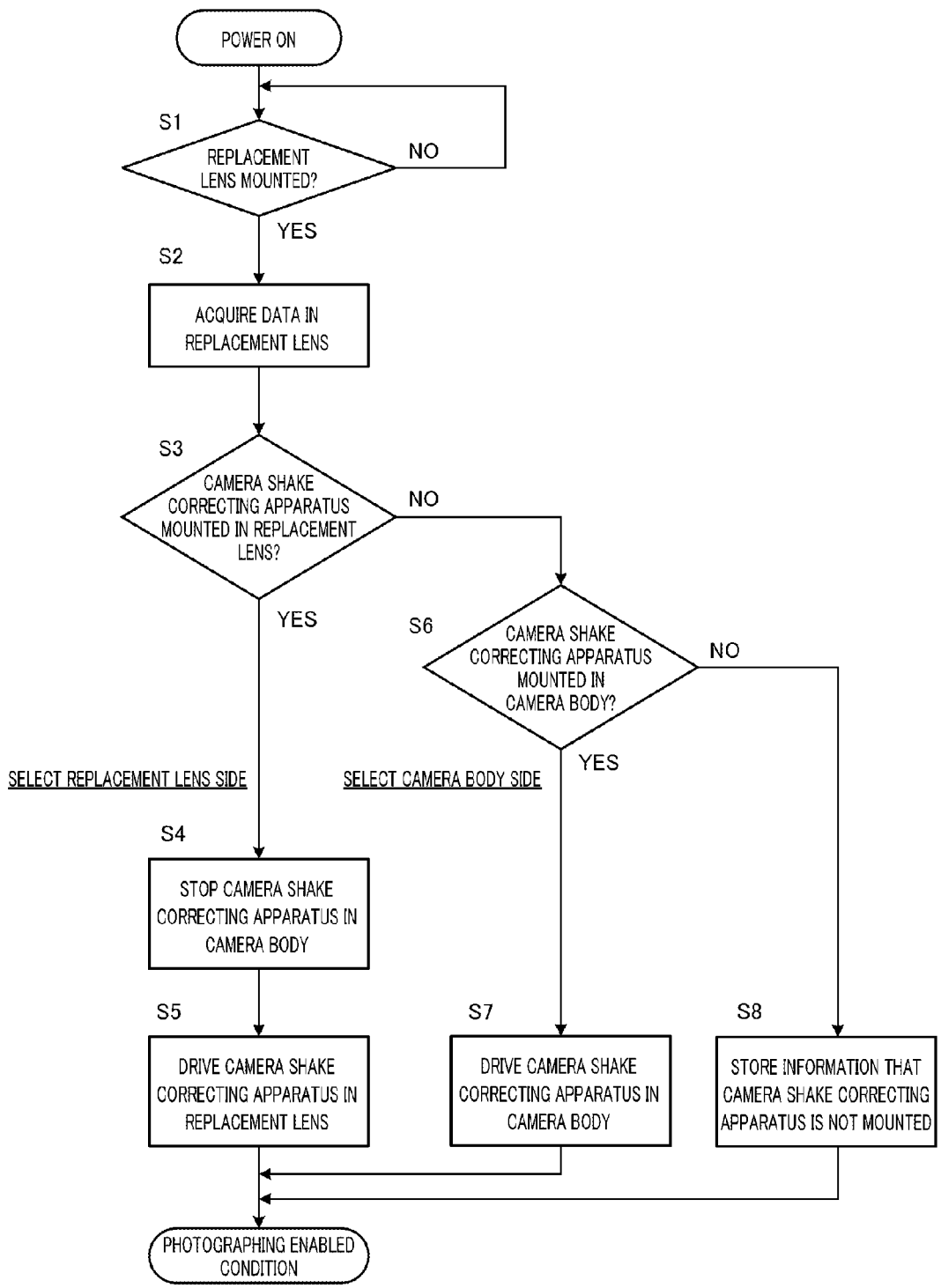
FIG. 11 is a flowchart showing a sequence regarding a selection operation by the camera shake correcting apparatus in the present embodiment.

FIG. 11 is a flowchart showing a sequence regarding a selection operation of a camera shake correcting apparatus of the present embodiment.

In the present embodiment, suppose when both replacement lens 2 and camera body 3 are mounted with a camera shake correcting apparatus, replacement lens camera shake correcting apparatus 82 on the replacement lens 2 side is selected preferentially. This is because the camera shake correction by replacement lens camera shake correcting apparatus 82 is considered to be advantageous over the camera shake correction by camera body camera shake correcting apparatus 75 for the following reasons. That is, this is based on the following reasons: (1) shake correction is more effective if carried out on the replacement lens 2 side, which is the source of shake (especially the telephoto lens); and (2) given that replacement lens 2 is designed for dedicated use and camera body 3 is designed for general use, shake correction, if carried out on the side of replacement lens 2 for dedicated use, provides optimal design for shake correction. However, the advantages and disadvantages of camera shake correction on the camera body 3 side (generally, correction by moving the CCD in the opposite direction to the shake direction) and camera shake correction on the replacement lens 2 side depend on design specifications and so on, and cannot be defined in a fixed manner. Furthermore, when the camera shake correcting apparatus is mounted on one of replacement lens 2 and camera body 3, use of the camera shake correcting apparatus mounted on the side with the camera shake correcting apparatus will be assumed in the following explanations.

First in step S1, body microcomputer 12 decides whether or not replacement lens 2 is attached. When replacement lens 2 is attached to camera body 3, body microcomputer 12 of camera body 3 detects the attachment of replacement lens 2.

In step S2, body microcomputer 12 acquires data in replacement lens 2.

In step S3, body microcomputer 12 decides whether or not camera shake correcting apparatus 82 is mounted in replacement lens 2 attached. After replacement lens 2 is attached, body microcomputer 12 acquires information as to whether or not replacement lens camera shake correcting apparatus 82 is mounted in replacement lens 2 from memory section 20a of lens microcomputer 20 in replacement lens 2. The information includes information as to whether or not the camera shake correcting apparatus is mounted, and body microcomputer 12 decides whether or not replacement lens camera shake correcting apparatus 82 is mounted in replacement lens 2 based on this information.

If, as a result of this decision, replacement lens camera shake correcting apparatus 82 is mounted in replacement lens 2, the step moves to step S4. On the other hand, if replacement lens camera shake correcting apparatus 82 is not mounted in replacement lens 2, the step moves to step S6.

In step S4, body microcomputer 12 stops camera body camera shake correcting apparatus 75 in camera body 3. As described above, if camera shake correcting apparatus 82 is mounted in replacement lens 2, this is intended to stop driving camera body camera shake correcting apparatus 75 on the camera body 3 side to give priority to replacement lens camera shake correcting apparatus 82.

In step S5, body microcomputer 12 starts driving replacement lens camera shake correcting apparatus 82 and finishes this sequence, thereby placing digital single-lens reflex camera 1 in a state ready to take photographs.

On the other hand, in step S6, to which the step moves when replacement lens camera shake correcting apparatus 82 is not mounted in replacement lens 2 as a result of the decision in step S3, body microcomputer 12 decides whether or not camera body camera shake correcting apparatus 75 is mounted in camera body 3.

If, as a result of this decision, camera body camera shake correction apparatus 75 is mounted in camera body 3, the step moves to step S7, and, on the other hand, when camera body camera shake correction apparatus 75 is not mounted in camera body 3, the step moves to step S8.

In step S7, body microcomputer 12 starts driving camera body camera shake correcting apparatus 75 and finishes this sequence, thereby placing digital single-lens reflex camera 1 in a state ready to take photographs.

On the other hand, in step S8, to which the step moves if as a result of the decision in step S6 camera body camera shake correcting apparatus 75 is not mounted in camera body 3, body microcomputer 12 memorizes, in its built-in memory section 12a, the fact that camera shake correcting apparatus is not mounted in replacement lens 2 or camera body 3, and digital single-lens reflex camera 1 shifts to a state in which photographs can be taken.

As described above, digital single-lens reflex camera 1 automatically decides whether a camera shake correcting apparatus is mounted in one or both of replacement lens 2 and camera body 3, and camera shake correcting apparatus 82 set up in advance in replacement lens 2 is driven preferentially, thereby allowing the camera shake correcting apparatus to operate normally without entailing malfunctions. The photographer may be allowed to select whether to use camera shake correcting apparatus 82 in replacement lens 2 or camera shake correcting apparatus 75 in camera body 3.

[Operation when Photograph is Taken]

Next, the operation of digital single-lens reflex camera 1 with the camera shake correcting function and photographing sensitivity changing function will be explained.

First, the photographing mode which is selectable in digital single-lens reflex camera 1 will be explained. The photographing mode includes "continuous shooting mode," in which shutter unit 10 is operated at time intervals of 0.3 seconds and photographs are taken a plurality of times (two or three or more times), "sensitivity increasing & camera shake correction automatic selection mode," "sensitivity increasing mode" and "camera shake correction mode," and so on (which will be described later), and the photographer can select a desired photographing mode. When the photographing mode is selected, body microcomputer 12 controls various types of control section according to the respective photographing modes.

Figure 12:
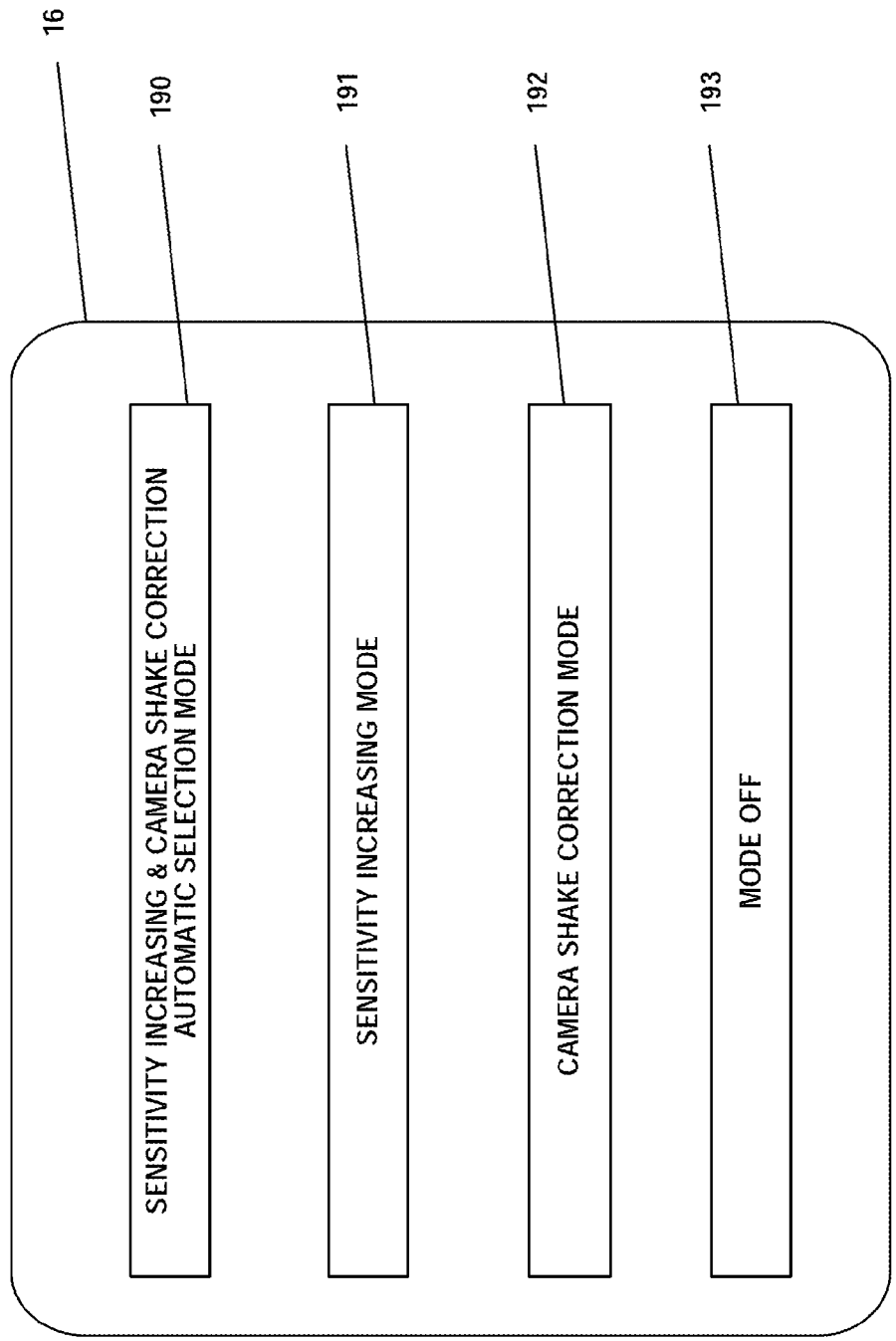
FIG. 12 shows a display example of a photographing mode selecting screen displayed on the display section in the present embodiment.

FIG. 12 illustrates a display example of a photographing mode selecting screen displayed on display section 16. The photographing mode selecting screen can be displayed on display section 16 by the photographer operating MENU setting operation section 56 or operation cross key 55. As shown in FIG. 12, the photographing mode includes sensitivity increasing & camera shake correction automatic selection mode, sensitivity increasing mode, camera shake correction mode and mode OFF, and the photographer can set the desired photographing mode by selecting icon 190, 191, 192 or 193. Although FIG. 12 displays only characteristic photographing mode selection icons in the present embodiment, the present invention is not limited to these and other photographing mode selection icons such as the above-described continuous shooting mode may also be displayed.

When sensitivity increasing mode selection icon 191 is selected, photographing sensitivity higher than normal photographing sensitivity is selected ("sensitivity increasing mode"). That is, digital signal amplification section 110 amplifies an image signal by a predetermined gain according to a command from body microcomputer 12. This makes it possible to shorten the exposure time and take a photograph at a faster shutter speed, thereby reducing the influence of camera shake.

When camera shake correction mode selection icon 192 is selected, the camera shake correcting function operates ("camera shake correction mode"). That is, digital single-lens reflex camera 1 drives one of camera body camera shake correcting apparatus 75 in camera body 3 and replacement lens camera shake correcting apparatus 82 in replacement lens 2 according to a command from body microcomputer 12, moves imaging sensor 11 or shake correction lens group 22 in two directions (up, down, left and right) within the plane perpendicular to the optical axis AZ and reduces camera shake.

When sensitivity increasing & camera shake correction automatic selection mode icon 190 is selected, body microcomputer 12 automatically switches the photographing mode to one of sensitivity increasing mode and camera shake correction mode according to the speed at which the subject moves. This causes photographing sensitivity to be set to high sensitivity when the subject moves at such a high speed to cause subject shake, whereas, when the subject moves at such a low speed subject shake is not caused, the camera shake correcting function that reduces camera shake operates. According to the present embodiment, when sensitivity increasing & camera shake correction automatic selection mode icon 190 is selected, the mode is automatically shifted to monitor photographing mode, which is a feature of the present embodiment. That is, body microcomputer 12 retracts quick return mirror 4 from within the optical axis AZ and automatically changes the focus detection scheme to a contrast scheme based on image data generated by imaging sensor 11. Furthermore, as a focus scheme, face-first focus mode may be adopted in which focus is set on the face of the subject preferentially, so that when the photographer selects face-first focus mode, the step moves to sensitivity increasing & camera shake correction automatic selection mode and automatically selects one of sensitivity increasing mode and camera shake correction mode.

When mode OFF selection icon 193 is selected, the above-described photographing sensitivity increasing function and camera shake correcting function do not operate and regular photographing in normal mode is possible.

Next, photographing process when sensitivity increasing & camera shake correction automatic selection mode is selected will be explained using a flowchart in FIG. 13.

Figure 13:
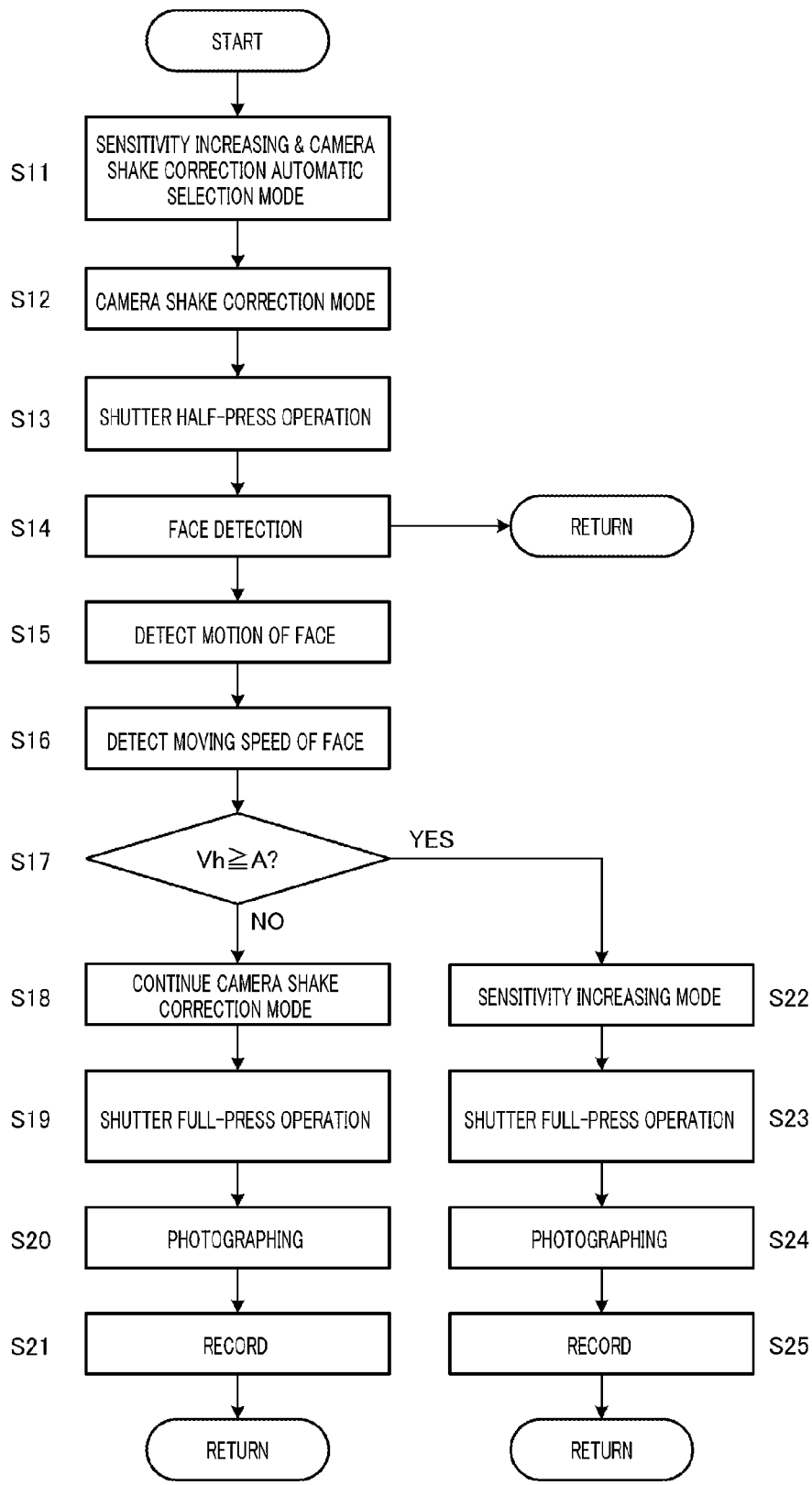
FIG. 13 is a flowchart showing the procedures of photographing process by the digital single-lens reflex camera according to the present embodiment.

FIG. 13 is a flowchart illustrating the steps of photographing process by digital single-lens reflex camera 1, which are executed by body microcomputer 12. This flowchart is started when, for example, power switch 52 of digital single-lens reflex camera 1 is set to the ON side.

In step S11, when the photographer operates MENU setting operation section 56 provided on the back of casing 3a of camera body 3, body microcomputer 12 makes display section 16 display an icon showing a list of photographing modes. When the photographer selects sensitivity increasing & camera shake correction automatic selection mode icon 190 from among the photographing mode selection icons displayed on display section 16, the step moves to S12 and camera shake correction mode starts.

In step S12, body microcomputer 12 switches the photographing mode to camera shake correction mode and makes one of camera shake correcting apparatus 75 in camera body 3 and camera shake correcting apparatus 82 in replacement lens 2 operate. Which camera shake correcting apparatus to be used is determined based on the method shown in the flowchart in FIG. 11.

In step S13, when the photographer half-presses shutter operation section 53, body microcomputer 12 recognizes that shutter operation section 53 is half-pressed, and moves the step to step S14.

In step S14, the face of the subject is detected. Face detection processing is performed by face detecting section 120. As the face detection method, there is a method of detecting contour information from the photographed image and detecting whether or not there are features (e.g. eyes, nose, mouth and so on) within the detected contour. If the detected contour shows features, face detection section 120 decides that there is a face.

FIG. 14 shows a display example where an image photographed in camera shake correction mode of digital single-lens reflex camera 1 is displayed on display section 16.

When face detection is performed, as shown in FIG. 14, an AF area frame Fa is set in a predetermined position on the photographing screen where face detection processing is performed on person A (the subject). As for the photographing subject, a specific subject may be set preferentially among a plurality of subjects. Furthermore, when a face cannot be detected as a subject, sensitivity increasing & camera shake correction automatic selection mode is exited and photographs continue being taken in normal camera shake correction mode.

In step S15, the motion of the face of the subject is detected. In face motion detection processing, motion detecting section 100 detects the motion of the subject to be photographed by chasing the representative points in a photographed image, and outputs a motion vector. Furthermore, for example, photometric processing and distance measuring processing are performed at the same time with the motion detection processing. In the photometric processing, digital signal processing section 68 calculates an exposure value based on an image signal outputted from imaging sensor 11. Body microcomputer 12 automatically sets an adequate shutter speed based on the calculated exposure value. Furthermore, in the distance measuring processing, focus lens group drive control section 25 moves focus lens group 24 in the optical axis AZ direction and adjusts focus so that the contrast value of the image signal shows a peak.

Furthermore, upon detecting the motion of the face of the subject, motion detection can be performed with reduced influence of camera shake, because camera shake correction is performed, thus improving the accuracy of motion detection. That is, it is possible to distinguish whether the motion of the image in imaging sensor 11 is caused by the motion of the subject or by the influence of the motion of the camera body due to the shake of the photographer's hand and so on. The motion of the subject is not limited to the motion of the subject's face alone and can be judged from the motion of the entire body of the subject.

In step S16, body microcomputer 12 calculates the moving speed Vh of the face of the subject per unit time from the motion vector detected by motion detecting section 100.

In step S17, the moving speed Vh is determined. To be more specific, a predetermined value A is registered in advance in digital single-lens reflex camera 1, and body microcomputer 12 compares the moving speed Vh with the predetermined value A. Here, this predetermined value A represents a threshold at which subject shake occurs and may be a value specific to digital single-lens reflex camera 1 or may be arbitrarily set by the photographer. For example, when a flash is used, shutter speed can be made faster, so that photographing sensitivity does not increase more than necessary by increasing the threshold. On the other hand, when taking a photograph of a child or pet likely to suddenly move after the subject speed is calculated and before the subject is photographed, such a method may be used that digital single-lens reflex camera 1 may be provided with child photographing mode or pet photographing mode separately so that, when the photographer selects the mode, the threshold is reduced to increase photographing sensitivity preferentially. On the other hand, when taking a photograph of a night view or when taking a photograph in a dark room, if the distance to the subject is too far for flash light to reach, it is also possible to reduce the threshold and increase photographing sensitivity preferentially. Furthermore, the threshold may be made variable according to image quality set when taking a photograph. For example, when taking photographs in the highest image quality (e.g. RAW file format (not compressed)), the threshold is increased to avoid image quality degradation due to increase of photographing sensitivity, and, when taking photographs in standard image quality, priority may be given to increasing photographing sensitivity by reducing the threshold.

The present embodiment is characterized in that the above-described threshold A is not a fixed value but can be a plurality of thresholds A1, A2, . . . , and the thresholds A1, A2, . . . , are set (selected) adaptively according to the combination of camera shake correcting apparatuses of replacement lens 2 and camera body 3. Here, the above-described threshold A normally has two values, threshold A1 for normal photographing mode and threshold A2 for high sensitivity preferential photographing mode (A1<A2). In this step S17, according to the combination of camera shake correcting apparatuses of replacement lens 2 and camera body 3, when, for example, in the case of a combination in high sensitivity preferential photographing mode, sensitivity increasing mode is started earlier by switching threshold A1 for normal photographing mode to threshold A2 for high sensitivity preferential photographing mode having a lower threshold (see FIG. 15, which will be described later).

When the amount of movement ΔY of an image on imaging sensor 11 expressed by equation 1 above increases, that is, when the focal length f of replacement lens 2 increases or the angle θ by which digital single-lens reflex camera 1 shakes increases, camera body camera shake correcting apparatus 75 normally has following defects (1) and (2) compared to the performance of camera shake correcting apparatus 82 mounted on replacement lens 2.

(1) If the amount of movement ΔY of an image on imaging sensor 11 exceeds, for example, 1 mm, the amount of drive of imaging sensor drive section 35 that drives imaging sensor 11 increases, and consequently the size of body camera shake correcting section 76 itself increases, which leads to an increase in the size of camera body 3.

(2) An increase in the amount of movement of imaging sensor 11 leads to deterioration of the optical performance of the subject image in the periphery of imaging sensor 11 such as a decrease in relative illumination.

Therefore, when the focal length f of replacement lens 2 is large, it is preferable to use camera shake correcting apparatus 82 for replacement lens 2 designed optimally to suit long focal length. Furthermore, even when angle θ by which digital single-lens reflex camera 1 shakes is large, it is preferable to use camera shake correcting apparatus 82 for replacement lens 2 designed optimally by taking into account decrease in relative illumination and so on.

Therefore, the present embodiment adopts a system configuration of changing threshold A depending on whether or not camera shake correcting apparatus 82 is mounted on replacement lens 2 and the focal length f of replacement lens 2.

FIG. 15 illustrates the relationship between a combination of camera shake correcting apparatuses in the replacement lens and the camera body of digital single-lens reflex camera 1, and threshold A.

Digital single-lens reflex camera 1 of the present embodiment has a camera shake correcting apparatus in at least one of camera body 3 and replacement lens 2 used in combination. Therefore, depending on the presence/absence of the camera shake correcting apparatus on the camera body side and on the replacement lens side, the following three photographing modes are set, that is, (1) normal photographing mode, (2) high sensitivity preferential photographing mode and (3) sensitivity increasing mode. Furthermore, when there is no camera shake correcting apparatus on the replacement lens side, threshold A of the photographing mode is changed according to the focal length of replacement lens 2 for the above-described reason. Here, depending on whether the focal length of replacement lens 2 is less than 300 mm or equal to or above 300 mm, normal photographing mode (threshold A1) or high sensitivity preferential photographing mode (threshold A2) (where A1>A2) is set. This is merely an example and two or more thresholds may be provided depending on the focal length set value or the focal length of replacement lens 2.

As shown in FIG. 15, when neither the camera body side nor the replacement lens side is provided with any camera shake correcting apparatus, sensitivity increasing mode is set regardless of whether the focal length of replacement lens 2 is below 300 mm or equal to or above 300 mm (see (a) and (b) in FIG. 15). When neither the camera body side nor the replacement lens side is provided with any camera shake correcting apparatus, by setting high sensitivity for photographing sensitivity, it is possible to shorten the exposure time, take a photograph at a faster shutter speed and thereby reduce the influence of camera shake.

Furthermore, if a camera shake correcting apparatus is provided on either the camera body side or the replacement lens side, normal photographing mode (threshold A1) is basically set (see (c), (d) and (f) in FIG. 15). More specifically, if camera shake correcting apparatus 82 is provided on the replacement lens side, normal photographing mode (threshold A1) is set regardless of whether or not there is camera shake correcting apparatus 75 on the camera body side (see (c) and (f) in FIG. 15). If camera shake correcting apparatus 75 is provided on the camera body side, one of normal photographing mode (threshold A1) and high sensitivity preferential photographing mode (threshold A2) is set depending on the presence/absence of camera shake correcting apparatus 82 on the replacement lens side. To be more specific, when the camera body side is provided with camera shake correcting apparatus 75, normal photographing mode (threshold A1) is set if camera shake correcting apparatus 82 is provided on the replacement lens side (see (f) in FIG. 15) or even if camera shake correcting apparatus 82 is not provided on the replacement lens side if the focal length of replacement lens 2 is below 300 mm (see (d) in FIG. 15). It should be noted that although normal photographing mode (threshold A1) in (c), (d) and (f) in FIG. 15 is the same normal photographing mode (threshold A1), normal photographing mode in (c) and (f) in FIG. 15 applies to the replacement lens side and normal photographing mode in (d) in FIG. 15 applies to the camera body side. In normal photographing mode, since photographing sensitivity is not increased more than necessary while camera shake is being effectively prevented, photographing of high image quality is made possible.

Furthermore, if camera shake correcting apparatus 75 is provided on the camera body side, if camera shake correcting apparatus 82 is provided on the replacement lens side and the focal length of replacement lens 2 is equal to or above 300 mm (see (e) in FIG. 15), high sensitivity preferential photographing mode (threshold A2) is set. In high sensitivity preferential photographing mode, the mode is shifted to sensitivity increasing mode earlier than in normal photographing mode and it is thereby possible to reduce the influence of camera shake.

Here, if camera shake correcting apparatuses are provided on both the camera body side and the replacement lens side, as shown in the flowchart above in FIG. 11, body microcomputer 12 gives higher priority to replacement lens camera shake correcting apparatus 82 and therefore stops driving camera shake correcting apparatus 75 on the camera body side. This is the case of normal photographing mode (threshold A1) in (f) in FIG. 15. Furthermore, if camera shake correcting apparatus 75 is provided on the camera body side and camera shake correcting apparatus 82 is not provided on the replacement lens side, normal photographing mode (threshold A1) or high sensitivity preferential photographing mode (threshold A2) is set depending on whether the focal length of replacement lens 2 is below 300 mm or equal to or above 300 mm in camera shake correcting apparatus 75 on the camera body side.

Figure 16:
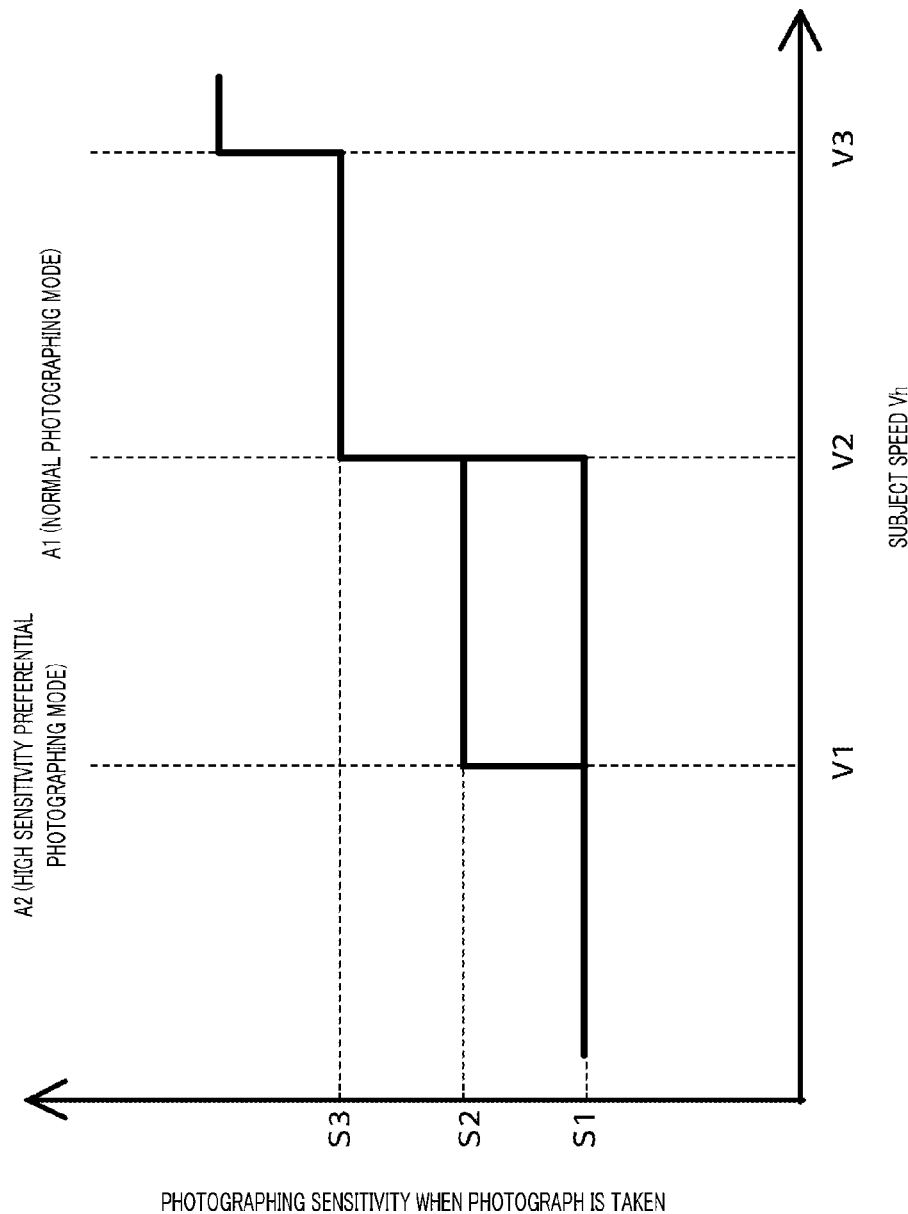
FIG. 16 illustrates a moving speed Vh of the subject based on a threshold A and switching of photographing sensitivity S when a photograph is taken according to the present embodiment.

FIG. 16 illustrates the moving speed Vh of the subject and switching of photographing sensitivity S when a photograph is taken according to threshold A. There are two types of threshold A, A1 and A2.

(1) In normal photographing mode (threshold A1), when the subject speed exceeds V2, sensitivity is increase gradually according to the subject speed.

In this case, irrespective of whether or not camera shake correcting apparatus 75 is mounted on camera body 3, combinations of the presence/absence of camera shake correcting apparatuses in replacement lens 2 and camera body 3 correspond to: when replacement lens 2 is mounted with camera shake correcting apparatus 82 (see (c) and (f) in FIG. 15); and when replacement lens 2 is not mounted with camera shake correcting apparatus 82, the focal length f is below 300 mm and camera body 3 is mounted with camera shake correcting apparatus 75 (see (d) in FIG. 15).

(2) In high sensitivity preferential photographing mode (threshold A2), when the subject speed exceeds V1, sensitivity is increase gradually according to the subject speed.

In this case, combinations of the presence/absence of camera shake correcting apparatuses in replacement lens 2 and camera body 3 correspond to: when replacement lens 2 is not mounted with camera shake correcting apparatus 82, the focal length f is equal to or above 300 mm and camera body 3 is mounted with camera shake correcting apparatus 75 (see (e) in FIG. 15).

(3) In case of sensitivity increasing mode (sensitivity increasing mode selection icon 191 shown in FIG. 12)

In this case, combinations of the presence/absence of camera shake correcting apparatuses in replacement lens 2 and camera body 3 correspond to: when none of replacement lens 2 or camera body 3 is mounted with any camera shake correcting apparatus (see (a) and (b) in FIG. 15).

These three modes are selectable by the photographer using MENU setting operation section 56 of digital single-lens reflex camera 1. However, in sensitivity increasing & camera shake correction automatic selection mode, when the subject is moving fast, threshold A1 for normal photographing mode is switched to threshold A2 for high sensitivity preferential photographing mode with a lower threshold using a combination of replacement lens 2 and camera body 3. That is, when threshold A1 for normal photographing mode is used, it is not until the subject speed reaches V2 that photographing sensitivity becomes S3, whereas, when threshold A2 for high sensitivity preferential photographing mode is used, photographing sensitivity becomes S2 when the subject speed reaches V1 and becomes S3 when the subject speed reaches V2.

Thus, according to the present embodiment, when a photograph is taken using a combination of replacement lens 2 and camera body 3 in an operating situation in which camera shake is likely to occur, the threshold at which the mode is shifted to sensitivity increasing mode is lowered to minimize the influence of camera shake so that sensitivity is increased earlier even by risking image quality.

A case has been explained in the present embodiment where the focal length f is 300 mm as shown in FIG. 15 as an example of the focal length f as a threshold switching condition, but the present invention is not limited to this value. Furthermore, threshold A may be changed according to not only the focal length f of replacement lens 2, but also other information such as a full-aperture F number. Especially when the full-aperture F number is small (e.g. F2), the influence of camera shake is insignificant, and so threshold A may be increased, while when the full-aperture F number is large (e.g. F8), the influence of camera shake is significant, and so threshold A may be lowered.

Returning to the flowchart in FIG. 13, if, as a result of a comparison in step S17, the moving speed Vh is equal to or above threshold A, body microcomputer 12 judges that the subject is moving at a speed subject shake does not occur, and moves the step to step S22. By contrast, when the moving speed Vh is below threshold A, body microcomputer 12 judges that subject shake does not occur, and moves the step to step S18. In a situation in which no subject shake occurs, ISO sensitivity, which is photographing sensitivity, is set equivalent to 64 and the shutter speed is set to 1/30 seconds and so on.

In step S18, body microcomputer 12 continues camera shake correction mode as the photographing mode and makes one of camera body camera shake correcting apparatus 75 in camera body 3 and replacement lens camera shake correcting apparatus 82 in replacement lens 2 operate.

In step S19, upon recognizing that the photographer has fully pressed shutter operation section 53, body microcomputer 12 moves the step to step 20. In this step S20, photographing process is performed. That is, in step S20, an image of the subject is formed on imaging sensor 11 and an image signal is outputted. The image signal outputted is displayed on display section 16. In this case, ISO sensitivity, which is photographing sensitivity, is displayed on display section 16, in addition to the photographed image.

In step S21, the image signal obtained in step S20 is recorded by image reading/recording section 18 and the photographing process is finished. Furthermore, when recording the image signal, the position of AF area Fa with respect to the entire photographed image is also recorded. Photographing is not limited to photographing of one photograph, but continuous shooting may also be performed.

Thus, when the moving speed Vh of the face of the subject is below threshold A, photographing sensitivity is not changed and the camera shake correcting function operates. This makes it possible to reduce camera shake caused by a shaking hand and so on and photograph images of high image quality.

On the other hand, if, as a result of the comparison in step S17, the moving speed Vh is equal to or above threshold A, body microcomputer 12 moves the step to step S22. In this step S22, body microcomputer 12 switches the photographing mode to sensitivity increasing mode. That is, digital signal gain setting section 111 sets a gain such that the photographing sensitivity is high. Here, body microcomputer 12 sets photographing sensitivity according to the moving speed of the face of the subject. To be more specific, body microcomputer 12 calculates the shutter speed free of subject shake from the moving speed Vh of the face of the subject and sets photographing sensitivity with which photographing at the calculated shutter speed is possible. For example, upon photographing a subject that is moving slowly at a walking speed in an outdoor environment, photographing sensitivity equivalent to ISO sensitivity 100 is set, and, upon photographing a subject that is moving at a running speed, photographing sensitivity equivalent to ISO sensitivity 400 is set, and in this way photographing sensitivity is set according to the moving speed of the face of the subject. As for photographing sensitivity, an upper limit may be set to suppress the quality degradation of photographed images. That is, in the case of sensitivity increasing mode, an upper limit of ISO sensitivity may be automatically set equivalent to ISO sensitivity 1600 so that the upper limit may be lowered compared to the case the upper limit can be set equivalent to up to ISO sensitivity 3200 when a regular photograph is taken. Furthermore, when an upper limit is set manually, the upper limit may be set such that it can only be set to a value lower than when a regular photograph is taken.

In step S23, upon recognizing that the photographer has fully pressed shutter operation section 53, body microcomputer 12 moves the step to step S24. In this step S24, photographing process is performed. That is, in step S24, an optical image of the subject is formed on imaging sensor 11 and imaging sensor 11 outputs an image signal. Digital signal amplification section 110 amplifies the image signal outputted from digital signal processing section 68 by the gain set in step S12.

Thus, in sensitivity increasing mode, photographs are taken in high sensitivity, that is, in higher ISO sensitivity than in normal mode or in camera shake correction mode. Furthermore, the exposure time is set short in this case so that the exposure value stays substantially the same.

In step S25, the image signal amplified in step S24 is recorded in image reading/recording section 18 and the photographing process is finished. Furthermore, when the image signal is recorded, the position of the AF area Fa with respect to the entire photographed image is also recorded at the same time. Photographing is not limited to taking one shot, and continuous shooting may also be performed. Furthermore, in photographing sensitivity increasing mode, the camera shake correcting apparatus may or may not be operated.

Here, when continuous shooting is performed in step S21 and step S25, the following processing is performed. When performing continuous shooting, performing continuous shooting processing itself does no, but the point in this continues shooting lies in taking a plurality of photographs (e.g. four photographs here) on a continuous basis based on different exposure conditions. That is, four photographs are taken continuously in one second, by operating shutter operation section 53 one time here. Furthermore, the photographing sensitivity is increased per shot. This is because the moving speed Vh of the subject is assumed to increase while photographs are taken. For example, digital signal gain setting section 111 sets the gain so that the photographing sensitivity is increased from ISO sensitivity 200 equivalents.

When, for example, four photographs are taken on a continuous basis, an optical image of the subject is first formed on imaging sensor 11 when the first photograph is taken, and imaging sensor 11 outputs an image signal. Digital signal amplification section 110 then amplifies the image signal outputted from digital signal processing section 68 by a gain set equivalent to ISO sensitivity 200. In this case, the shutter speed is set to 1/60 seconds. Next, when the second photograph is taken, an optical image of the subject is formed on imaging sensor 11 and imaging sensor 11 outputs an image signal. Digital signal amplification section 110 amplifies the image signal outputted from digital signal processing section 68 by a gain set equivalent to ISO sensitivity 400. In this case, the shutter speed is set to 1/125 seconds. Next, when the third photograph is taken, an optical image of the subject is formed on imaging sensor 11 and imaging sensor 11 outputs an image signal. Digital signal amplification section 110 amplifies the image signal outputted from digital signal processing section 68 by a gain set equivalent to ISO sensitivity 800. In this case, the shutter speed is set to 1/250 seconds. Finally, when the fourth photograph is taken, an optical image of the subject is formed on imaging sensor 11 and imaging sensor 11 outputs an image signal. Digital signal amplification section 110 amplifies the image signal outputted from digital signal processing section 68 by a gain set equivalent to ISO sensitivity 1600. In this case, the shutter speed is set to 1/500 seconds.

Thus, in sensitivity increasing mode for continuous shooting, taking photographs in high sensitivity, that is, taking photographs in higher ISO sensitivity than in normal mode or camera shake correction mode is performed. Furthermore, the exposure time is set short such that the exposure value stays substantially the same.

The four photographed images taken by continuous shooting are obtained with ISO sensitivity and shutter speed changed so as to keep the exposure value constant, and the four photographed images taken by continuous shooting may be displayed in thumbnails on display section 16 after photographs have been taken. In this case, thumbnail display number 1 to 4 and each ISO sensitivity are displayed on display section 16.

Furthermore, as for the four photographed images taken by continuous shooting, the four images may be automatically recorded or the photographer may arbitrary select and save images.

Thus, when the moving speed Vh of the face of the subject is above threshold A, the photographing sensitivity is set to high sensitivity. This makes it possible to shorten the exposure time and realize photographing at a faster shutter speed, thereby preventing subject shake. In photographing sensitivity increasing mode, the camera shake correcting apparatus may or may not be made to operate.

As described above, according to the present embodiment, when digital single-lens reflex camera 1 changes the photographing mode to sensitivity increasing & camera shake correction automatic selection mode, quick return mirror 4 is automatically brought up and the focus detection scheme is changed from a phase difference detection scheme to a contrast detection scheme. Furthermore, a live view is displayed on display section 16 to allow photographing using display section 16.

Furthermore, a motion vector is detected through contrast detection and if the subject speed is equal to or above threshold A, photographing sensitivity is increased. By contrast, if the subject speed is below threshold A, camera shake correction is made to operate to suppress the influence of the shake of the photographer's hand.

Furthermore, camera body 3 reads information such as the focal length of replacement lens 2 and full-aperture F number and sets an optimum threshold in individual replacement lens 2 based on this information.

Furthermore, if camera shake correcting apparatus 82 is mounted on replacement lens 2, the photographing mode is automatically shifted to sensitivity increasing & camera shake correction mode. On the other hand, if camera shake correcting apparatus 82 is not mounted on replacement lens 2, the photographing mode is automatically shifted to sensitivity increasing mode.

As described so far, digital single-lens reflex camera 1 can also photograph images of high quality free of camera shake or subject shake. Furthermore, camera body 3 reads information about replacement lens 2, thereby setting a photographing condition and a photographing mode that is suitable for replacement lens 2.

The present embodiment is digital single-lens reflex camera 1 comprised of camera body 3 and replacement lens 2 detachably mounted on camera body 3. A compact digital camera generally includes an imaging sensor, a focusing means that performs focus detection based on a contrast scheme using the imaging sensor, a motion detecting means that detects a the subject speed from an image on the imaging sensor, and a camera shake correcting means that performs camera shake correction according to the subject speed detected in the motion detecting means. Furthermore, when the lens is used to take photographs, the single-lens reflex camera changes the position of a return mirror fast and retracts the return mirror from the photographing optical path, thereby switching the finder optical path to a photographing optical path and enabling the return mirror to return to its regular position when photographs have been taken. However, conventional digital single-lens reflex cameras having a movable return mirror do not have a system that performs camera shake correction realized in compact digital cameras.

The present embodiment provides a digital single-lens reflex camera including monitor photographing mode with a camera shake correcting function.

Furthermore, there are already many conventional replacement lenses having a camera shake correcting apparatus that corrects the shake of optical images. The digital single-lens reflex camera according to the present embodiment is extremely useful from the standpoint of effectively making the most of resources of these replacement lenses having a camera shake correcting apparatus.

Furthermore, the present embodiment calculates the subject speed based on the motion of the detected subject, decides whether or not the subject speed is equal to or above threshold A, operates, if the subject speed is below threshold A, one of camera body camera shake correcting apparatus 75 in camera body 3 and replacement lens camera shake correcting apparatus 82 in replacement lens 2 and increases, if the subject speed is equal to or above threshold A, the gain of digital signal gain setting section 111, increases ISO sensitivity, increases the shutter speed, shortens the exposure time and photographs a plurality of images continuously based on different exposure conditions by one shutter operation, thereby reducing image quality degradation caused by camera shake or subject shake and allowing photographs to be taken in high quality at ease.

To be more specific, if the motion of the subject is fast, the photographing sensitivity is changed to high sensitivity, the exposure time is shortened and a photograph is taken at a fast shutter speed. This can prevent image quality degradation caused by subject shake. On the other hand, if the motion of the subject is slow, one of camera body camera shake correcting apparatus 75 in camera body 3 and replacement lens camera shake correcting apparatus 82 in replacement lens 2 is made to operate, thereby making it possible to prevent camera shake caused by a shaking hand and reduce image quality degradation. Therefore, the photographer can simply take a photograph regardless of the motion of the subject.

Furthermore, if the motion of the subject is fast, the photographing sensitivity is automatically changed to high sensitivity, and therefore the photographer need not observe the motion of the subject and decide whether or not subject shake occurs, and a high degree of convenience is thereby provided.

Furthermore, if the detected subject speed is equal to or above threshold A, the present embodiment changes photographing sensitivity to high sensitivity. This prevents the photographer from wrongly setting high photographing sensitivity although the subject is moving at a speed to cause subject shake.

Especially according to the present embodiment, at the time of shutter full-press operation after change to sensitivity increasing mode, continuous shooting is performed based on a plurality of exposure conditions by one shutter operation, allowing the photographer to take photographs based on a plurality of exposure conditions at a time. In this case, by increasing the photographing sensitivity and shutter speed per shot, it is possible to also support a case where the moving speed Vh of the subject increases while photographs are taken. Even the situation in which the moving speed of the subject changes substantially the moment the photographer fully presses shutter operation section 53 (for example, when photographing a child) can be sufficiently supported by taking photographs by increasing the shutter speed during continuous shooting. By photographing a subject continuously based on a plurality of exposure conditions and recording photographed images, even if the moving speed of the subject changes substantially while photographs are taken, there is a high possibility that images of high image quality may be included in one of a plurality of images photographed on a continuous basis under the plurality of exposure conditions, and, consequently, images free of subject shake are recorded. Therefore, the photographer can select a thumbnail display number from buffer memory 69 in which four images photographed on a continuous basis based on different exposure conditions are recorded, and save the best image free of subject shake.

Furthermore, instead of detecting the overall the motion of the subject, the motion of the face of the subject is focused among various motions of the subject, and if the motion of the face of the subject is slow, one of camera shake correcting apparatus 75 in camera body 3 and camera shake correcting apparatus 82 in replacement lens 2 is made to operate, and if the motion of the face of the subject is fast, photographing sensitivity is changed to high sensitivity, and it is thereby possible to switch from camera shake correction control to photographing sensitivity control with high sensitivity according to the motion of the face of the subject which is assumed to be the one expected by the photographer to be photographed with the highest quality. Therefore, even if the moving speed of part or whole of the detected subject is equal to or above threshold A, if the motion of the face of the subject is below threshold A, camera shake correction mode is continued and does not change to sensitivity increasing mode. That is, camera shake correction mode is continued as long as possible until the motion of the face of the subject exceeds threshold A, and it is not until the motion of the face of the subject exceeds threshold A that the mode is shifted to sensitivity increasing mode. For example, in a situation in which the subject is a person and the person is waving his/her hand and his/her face does not show much motion, the mode does not shift to sensitivity increasing mode, thus preventing photographing sensitivity from increasing more than necessary. If the subject speed is slow, this can prevent deterioration of image quality caused when ISO sensitivity is increased. Since it is assumed that the photographer may consider it best to photograph the face of the subject, ISO sensitivity is not increased if the face does not move. Although subject motion detection has been performed preferentially for the face of the subject, a system is also possible that allows the photographer to arbitrarily adopt a setup for judging the motion of the subject based on the overall motion of the subject. Furthermore, as for detection of the motion of the subject, the motion of the eyes of the subject in particular is detected and when, for example, a person blinks and closes his/her eyes, the subject may be judged to have moved and ISO sensitivity may be increased.

The imaging control according to the present embodiment might prove especially useful for telephotography in, for example, athletic meets, and the present embodiment is especially effective when used in such a situation. By detecting the motion of the face of the subject and determining photographing sensitivity, even if, for example, the subject's hand or foot moves, it is not necessary to increase photographing sensitivity more than necessary, thereby preventing degradation of image quality caused by increased photographing sensitivity.

Here, the relationship between change in the speed of the subject and photographing sensitivity, during the period from a shutter half-press operation, via a shutter full-press operation, to photographing will be explained.

Figure 17:
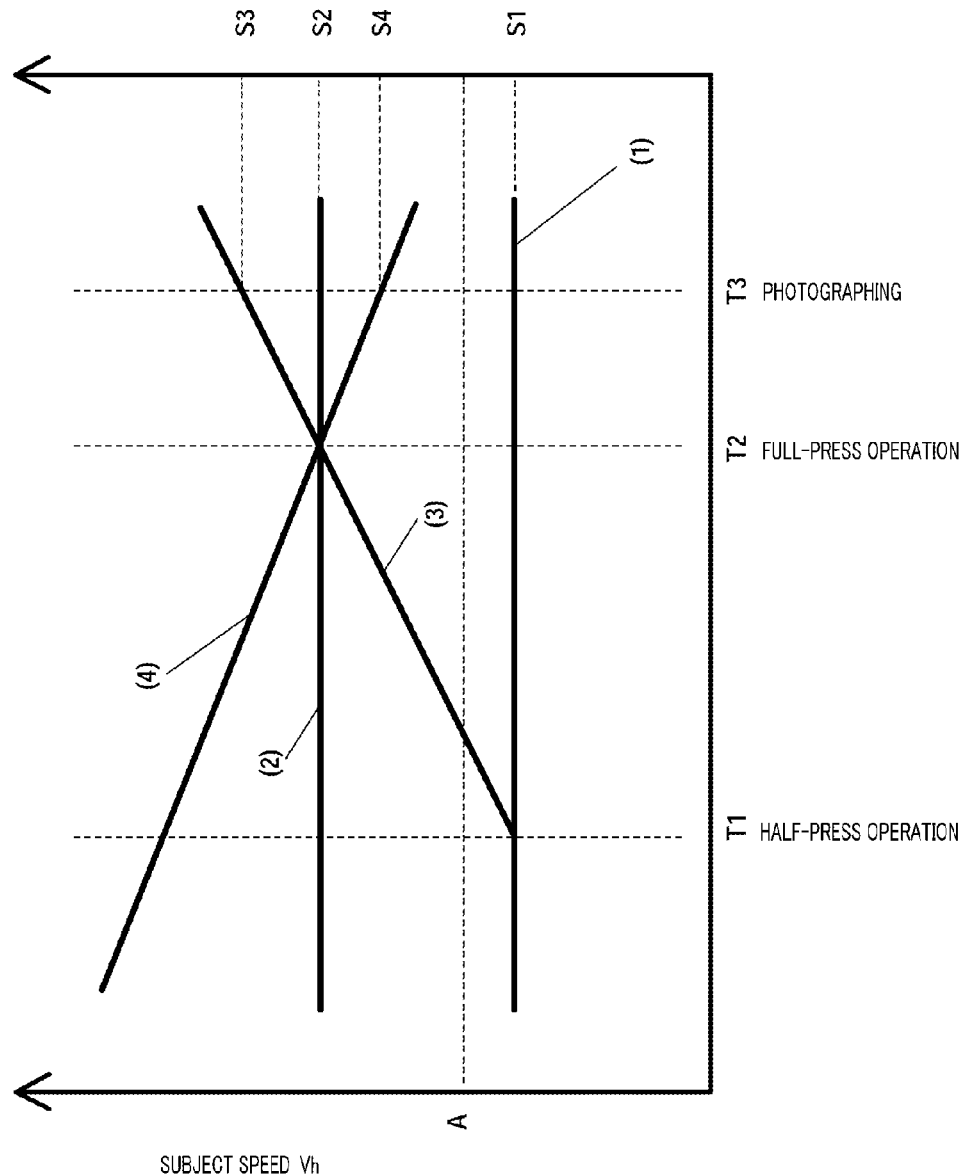
FIG. 17 illustrates a relationship between the moving speed Vh of the subject and photographing sensitivity S when a photograph is taken according to the present embodiment.

FIG. 17 illustrates a relationship between the moving speed Vh of the subject and photographing sensitivity S upon taking a photograph. In FIG. 17, T1 denotes shutter half-press operation timing, T2 denotes shutter full-press operation timing and T3 denotes photographing timing. Furthermore, S1 to S4 denote photographing sensitivity upon taking a photograph and A denotes a threshold. Whether the subject speed Vh is equal to or above threshold A is judged, and if the subject speed is below threshold A, one of camera shake correcting apparatus 75 in camera body 3, and camera shake correcting apparatus 82 in replacement lens 2 is made to operate and when the subject speed Vh is equal to or above threshold A, the ISO sensitivity is increased or the shutter speed is increased (either one or both of the ISO sensitivity and shutter speed may be increased). Although the present embodiment has two values, threshold A1 for normal photographing mode and threshold A2 for high sensitivity preferential photographing mode (where A1>A2), suppose A1 and A2 are represented by threshold A here in the explanations below.

The present embodiment starts motion vector detection for the subject in synchronization with the shutter half-press operation (step S15 in FIG. 13). Motion vector detection is performed until immediately before a shutter full-press operation (step S18 and step S22 in FIG. 13) every certain period and the subject speed at the time a shutter full-press operation is made the final subject speed Vh. In this case, in FIG. 17, assuming (1) is a case where there is no the motion of the subject, (2) is a case where the subject is moving at constant speed, (3) is a case where the subject is accelerating at a certain rate and (4) is a case where the subject is decelerating at a certain rate, the relationship between change in the speed of the subject and photographing sensitivity upon taking the first photograph, is as follows.

(1) When subject speed Vh during shutter half-press operation is below threshold A and constant In this case, since the subject speed Vh is below threshold A, photographing sensitivity is not increased and the sensitivity is set to photographing sensitivity S1 in normal photographing mode.

(2) When subject speed Vh during shutter half-press operation is above threshold A and constant In this case, photographing sensitivity is increased according to the subject speed Vh during shutter full-press operation. Here, the sensitivity is set to photographing sensitivity S2.

(3) When subject speed Vh exceeds threshold A during shutter half-press operation and increases gradually In this case, since the subject speed Vh increases gradually, acceleration is calculated, the amount of speed increased is predicted for the time lag from the time of shutter full-press operation to actual photographing and sensitivity is set to photographing sensitivity S3 (S2<S3). Furthermore, in this case, it is preferable to increase the photographing sensitivity and shutter speed per shot in the consecutive shooting of the second and subsequent photographs.

(4) When subject speed Vh during shutter half-press operation exceeds threshold A and slows down gradually Opposite to case (3) above, when the subject speed Vh slows down gradually, the amount of speed slowed down is predicted and the sensitivity is set to photographing sensitivity S4 (S4<S2). Furthermore, in this case, it is preferable to decrease photographing sensitivity and shutter speed per shot in the consecutive shooting of the second and subsequent photographs.

The explanations so far are illustrations of a preferable embodiment of the present invention and the scope of the present invention is not limited to this.

The feature of the present invention is applicable to any apparatus as long as it is an electronic apparatus having an imaging apparatus. For example, the present invention is applicable not only to a digital camera and video camera, but also to a mobile phone set with a camera, portable information terminal such as a PDA (Personal Digital Assistant) and information processing apparatus such as a personal computer with an imaging apparatus.

Furthermore, when continuous shooting is performed, a plurality of continuing photographs may be taken based on different exposure conditions and, for example, before four continuing photographs are taken with high sensitivity, one photograph is taken with ISO sensitivity 100 equivalents which is photographing sensitivity in normal mode and a total of five photographs may be taken through normal photographing and high sensitivity photographing by one shutter operation.

Furthermore, in camera shake correction mode, continuous shooting may be performed by one shutter operation by a plurality of exposure conditions. This allows the photographer to take photographs based on a plurality of exposure conditions at a time. In this case, the photographing sensitivity of the first photograph is the same ISO sensitivity as in regular photographing. For the second and subsequent photographs, even the case where the moving speed Vh of the subject increases while photographs are taken can also be supported by increasing the photographing sensitivity and shutter speed per shot. Even a situation in which the moving speed of the subject changes substantially the moment the photographer fully presses shutter operation section 53 (for example, when taking a photograph of a child) can be sufficiently supported by taking photographs by increased shutter speed in the case of continuous shooting. Furthermore, as described above, photographing sensitivity and shutter speed may be changed according to a variation of the subject speed Vh in the middle of shutter half-press operation.

Figure 18:
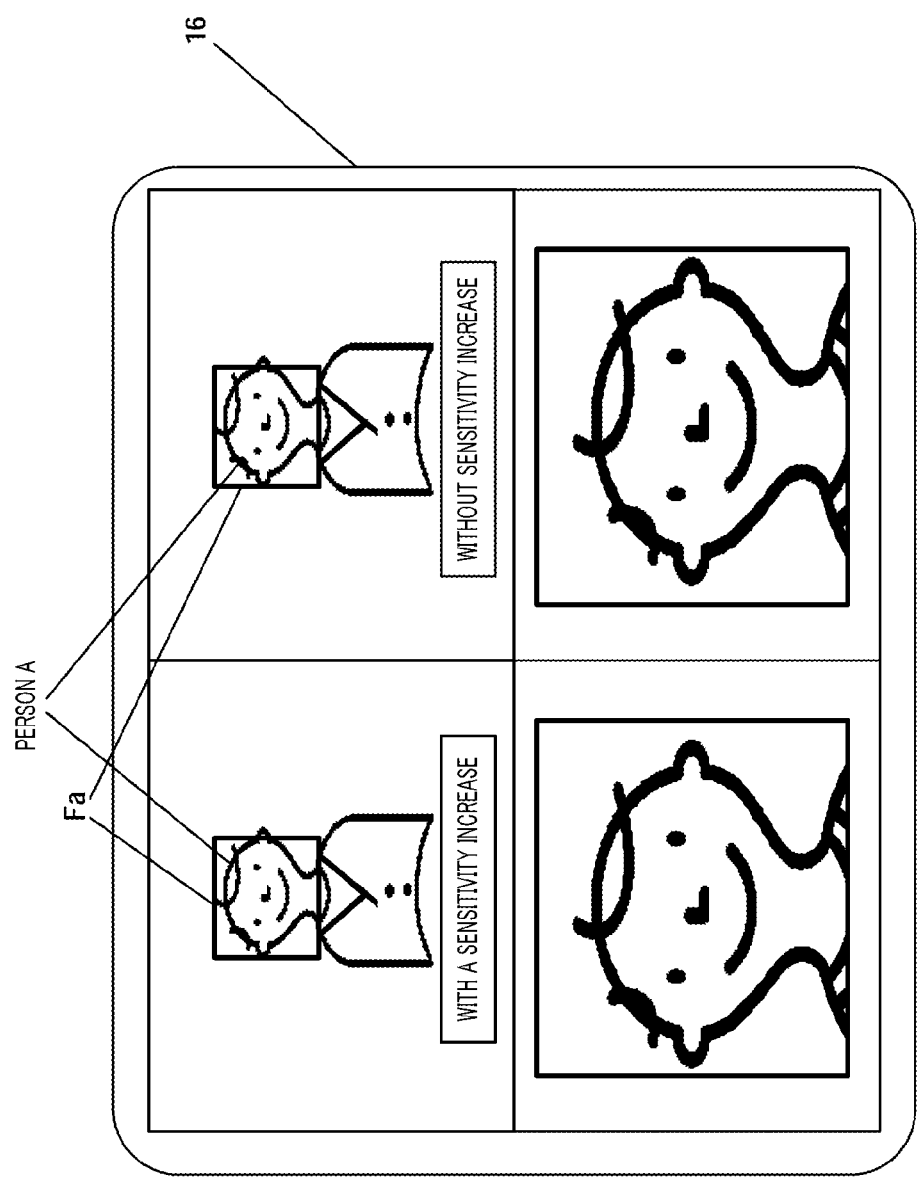
FIG. 18 shows a display example of a photographed image with a sensitivity increase and a photographed image without a sensitivity increase displayed together on the display section after photographing sensitivity increasing mode is set in the digital single-lens reflex camera according to the present embodiment.

FIG. 18 shows a display example of a photographed image with a sensitivity increase and a photographed image without a sensitivity increase displayed on display section 16 after the setup of photographing sensitivity increasing mode of the digital single-lens reflex camera according to the present embodiment. As shown in FIG. 18, continuous shooting may be performed by one shutter operation and images with increased sensitivity and images without a sensitivity increase with different photographing sensitivities may be photographed so that the photographed images of two modes and image qualities may be compared immediately after photographs are taken or at the time of playback. Furthermore, images may be displayed enlarged centered on the AF area Fa automatically or manually using operation cross key 55 and so on so that a total of four photographed images may be displayed together on display section 16.

Furthermore, when a photograph is taken using a self-timer and so on, the motion of the optical image of the subject may be detected from a few seconds after shutter operation section 53 is fully pressed until photographs start being taken. More preferably, an LED and so on may be provided in the front of digital camera 1 and made to blink during motion detection so that the blinking may be recognized from the subject side.

The configuration of the imaging optical system and camera shake correcting section according to the present embodiment is not limited to the above-described configuration. Replacement lens camera shake correcting apparatus 82 may also have, for example, a configuration in which the angle of the prism provided in the front of replacement lens 2 on the subject side may be changed and the configuration thereof is not limited to such a configuration if the configuration at least allows camera shake correction. Furthermore, camera body camera shake correcting apparatus 75 may also be based on an electronic type camera shake correction scheme whereby an image extracting position in imaging sensor 11 may be changed and corrected or a plurality of photographs of the same subject may be taken at a short shutter speed and then combined as one image and so on and it is obvious that the scheme thereof is not limited.

Furthermore, a case has been described with the present embodiment where the time of exposure to the imaging sensor is controlled by operating the shutter, but the present invention is not limited to this and the exposure time of the imaging sensor may be controlled through an electronic shutter and so on.

Furthermore, a case has been described with the present embodiment as an example where a plurality of images can be photographed continuously by operating shutter operation section 53 one time, but such a system may be adopted that photographs can be taken only in the period in which shutter operation section 53 is operated (e.g. pressed).

Furthermore, the present embodiment uses the name "digital single-lens reflex camera," but this is for convenience of explanation and it goes without saying that the name may also be a "photographing apparatus," "digital camera" or "imaging method."

Furthermore, the components making up the above-described digital single-lens reflex camera, for example, the type of the imaging optical system, the drive section thereof and mounting method and so on or further the type of the motion detecting section are not limited to those of the embodiments above.

Furthermore, the digital single-lens reflex camera explained so far may also be implemented by a program for executing the photographing control method for this digital single-lens reflex camera. This program is stored in a computer-readable recording medium.

The disclosure of Japanese Patent Application No. 2007-180318, filed on Jul. 9, 2007, including the specification, drawings and abstract is incorporated herein by reference in its entirety.

INDUSTRIAL APPLICABILITY

The digital single-lens reflex camera according to the present invention is suitable for use in a digital still camera, digital video camera, mobile phone provided with a camera section and PDA and so on for which images of high image quality are required.

The invention claimed is:
1. A camera comprising:
an imaging optical system that forms an optical image of a subject to be photographed;
an imaging sensor that receives the formed optical image, converts the optical image to an electrical image signal, and outputs the image signal;
a camera shake correcting section that corrects shake of the optical image caused by motion of the camera body;
a focusing section that performs focus detection in a condition where the camera shake correcting section is operating;
a motion detecting section that measures, in the condition where, during a shutter half-press condition, the camera shake correcting section is operating, motion of the subject to be photographed in a predetermined time before a photograph is taken, and detects a speed of the subject from the motion of the subject to be photographed; and
a control section that determines an amplification factor and an exposure time during the shutter half-press condition, increases the amplification factor of the image signal and shortens the exposure time when the subject speed detected by the motion detecting section is equal to or higher than a threshold, and takes a photograph by the imaging sensor.

2. The camera according to claim 1, wherein the control section controls the camera shake correcting section to execute camera shake correction when the subject speed detected by the motion detecting section is lower than the threshold.

3. The camera according to claim 1, wherein, when the subject speed detected by the motion detecting section is equal to or higher than the threshold, the control section provides varying exposure times or amplification factors and causes a photograph to be taken a plurality of times.

4. The camera according to claim 3, wherein the control section causes the photograph to be taken a plurality of times by at least one of controlling the exposure time to be shorter per shot and controlling the amplification factor to be higher per shot.

5. The camera according to claim 1, wherein the control section predicts the subject speed when a photograph is taken based on an amount of variation of the subject speed within a predetermined time and controls the exposure time or amplification factor according to the predicted subject speed.

6. The camera according to claim 1, wherein the camera shake correcting section is mounted in at least one of a camera body and a replacement lens.

7. The camera according to claim 6, wherein the control section changes the threshold based on focus length information about the replacement lens used.

8. The camera according to claim 6, wherein the control section changes the threshold depending on whether the camera shake correcting section is mounted on the camera body side or the replacement lens side.

9. The camera according to claim 6, further comprising a detecting section that detects presence and absence of the camera shake correcting section on the replacement lens side,
wherein, when the replacement lens has the camera shake correcting section, the control section controls the camera shake correcting section via an interface section.

10. The camera according to claim 6, wherein the control section switches between shake correction performed electrically through control over the amplification factor or exposure time on the camera body side, and shake correction performed optically by the camera shake correcting section on the replacement lens side, according to the subject speed detected by the motion detecting section.

* * * * *